US008311812B2

(12) United States Patent
Kroeker et al.

(10) Patent No.: US 8,311,812 B2
(45) Date of Patent: Nov. 13, 2012

(54) FAST AND ACCURATE EXTRACTION OF FORMANTS FOR SPEECH RECOGNITION USING A PLURALITY OF COMPLEX FILTERS IN PARALLEL

(75) Inventors: John P. Kroeker, Hamilton, MA (US); Janet Slifka, Hopkinton, MA (US); Richard S. McGowan, Lexington, MA (US)

(73) Assignee: Eliza Corporation, Danvers, MA (US)

( * ) Notice: Subject to any disclaimer, the term of this patent is extended or adjusted under 35 U.S.C. 154(b) by 436 days.

(21) Appl. No.: 12/629,006

(22) Filed: Dec. 1, 2009

(65) Prior Publication Data

US 2011/0131039 A1 Jun. 2, 2011

(51) Int. Cl.
*G10L 15/02* (2006.01)
*G10L 19/02* (2006.01)

(52) U.S. Cl. ........................................ 704/209

(58) Field of Classification Search .................. 704/203, 704/205, 206, 207, 209, 211, 231
See application file for complete search history.

(56) References Cited

U.S. PATENT DOCUMENTS 3,649,765 A * 3/1972 Rabiner et al. ................ 704/209
4,192,210 A * 3/1980 Deutsch .......................... 84/622
4,346,262 A * 8/1982 Willems et al. ............... 704/217
4,813,076 A * 3/1989 Miller ........................... 704/254
4,813,328 A * 3/1989 Takauji .......................... 84/625
5,381,512 A * 1/1995 Holton et al. .............. 704/200.1
5,463,716 A * 10/1995 Taguchi ........................ 704/209
6,098,036 A * 8/2000 Zinser et al. .................. 704/219
6,233,552 B1 * 5/2001 Mustapha et al. ............ 704/209
6,577,968 B2 6/2003 Nelson
7,085,721 B1 * 8/2006 Kawahara et al. ............ 704/258
7,457,756 B1 11/2008 Nelson et al.
7,492,814 B1 2/2009 Nelson
7,522,594 B2 4/2009 Piche et al.
7,624,195 B1 11/2009 Biswas et al.
7,756,703 B2 * 7/2010 Lee et al. ...................... 704/209
2002/0128834 A1 * 9/2002 Fain et al. ..................... 704/246

(Continued)

FOREIGN PATENT DOCUMENTS

KR 1020040001141 A 1/2004

(Continued)

OTHER PUBLICATIONS

Kaniewska, Magdalena, "On the instantaneous complex frequency for pitch and formant tracking", Signal Processing Algorithms, Architectures, Arrangements, and Applications (SPA), Sep. 25-27, 2008, pp. 61 to 66.*

(Continued)

*Primary Examiner* — Martin Lerner
(74) *Attorney, Agent, or Firm* — Russ Weinzimmer; Russ Weinzimmer & Associates PC

(57) ABSTRACT

A method and apparatus are provided for determining an instantaneous frequency and an instantaneous bandwidth of a speech resonance of a speech signal. The method includes receiving a speech signal having a real component; filtering the speech signal so as to generate a plurality of filtered signals such that the real component and an imaginary component of the speech signal are reconstructed; and generating a first estimated frequency and a first estimated bandwidth of a speech resonance of the speech signal based on both a first filtered signal of the plurality of filtered signals and a single-lag delay of the first filtered signal.

42 Claims, 10 Drawing Sheets

U.S. PATENT DOCUMENTS

| | | | | |
|---|---|---|---|---|
| 2004/0228469 | A1 | 11/2004 | Andrews et al. | |
| 2005/0049866 | A1 * | 3/2005 | Deng et al. | 704/240 |
| 2005/0065781 | A1 * | 3/2005 | Tell et al. | 704/203 |
| 2006/0143000 | A1 * | 6/2006 | Setoguchi | 704/205 |
| 2007/0071027 | A1 | 3/2007 | Ogawa | |
| 2007/0112954 | A1 | 5/2007 | Ramani et al. | |
| 2007/0276656 | A1 * | 11/2007 | Solbach et al. | 704/200.1 |
| 2008/0082322 | A1 * | 4/2008 | Joublin et al. | 704/209 |

FOREIGN PATENT DOCUMENTS

| | | |
|---|---|---|
| KR | 1020060013152 A | 2/2006 |

OTHER PUBLICATIONS

Potamianos et al., "Speech Formant Frequency and Bandwidth Tracking Using Multiband Energy Demodulation", 1995 International Conference on Acoustics, Speech, and Signal Processing, ICASSP-1995, May 9-12, 1995, vol. 1, pp. 784 to 787.*

Jones et al., "Instantaneous Frequency, Instantaneous Bandwidth and the Analysis of Multicomponent Signals", 1990 International Conference on Acoustics, Speech, and Signal Processing, ICASSP-1990, Apr. 3-6, 1990, vol. 5, pp. 2467 to 2470.*

Cohen et al., "Instantaneous Bandwidth and Formant Bandwidth", Conference on Statistical Signal and Array Processing, Oct. 7-9, 1992, pp. 13 to 17.*

Kenneth N. Stevens, Acoustic Phonetics, book, 1998, pp. 258-259, Massachusetts Institute of Technology, United States.

Francois Auger and Patrick Flandrin, Improving the Readability of Time-Frequency and Time-Scale Representations by the Reassignment Method, publication, 1995, pp. 1068-1089, vol. 43, IEEE.

T. J. Gardner and M. O. Magnasco, Instantaneous Frequency Decomposition: An Application to Spectrally Sparse Sounds with Fast Frequency Modulations, publication, 2005, pp. 2896-2903, vol. 117; No. 5, Acoustical Society of America, United States.

Randy S. Roberts, William A.. Brown, and Herscel H. Loomis, Jr., Computationally Efficient Algorithms for Cyclic Spectral Analysis, magazine, 1991, pp. 38-49, IEEE, United States.

David T. Blackstock, Fundamentals of Physical Acoustics, book, 2000, pp. 42-44, John Wiley & Sons, Inc., United States and Canada.

Iwao Sekita, Takio Kurita, and Nobuyuki Otsu, Complex Autoregressive Model and Its Properties, publication, 1991, pp. 1-6, Electrotechnical Laboratory, Japan.

Saeed V. Vaseghi, Advanced Digital Signal Processing and Noise Reduction, book, 2006, pp. 213-214, 3rd edition, John Wiley & Sons, Ltd, England.

Malcolm Slaney, An Efficient Implementation of the Patterson-Holdsworth Auditory Filter Bank, technical report, 1993, pp. 2-41, Apple Computer Technical Report #35, Apple Computer, Inc., United States.

* cited by examiner

FAST AND ACCURATE EXTRACTION OF FORMANTS FOR SPEECH RECOGNITION USING A PLURALITY OF COMPLEX FILTERS IN PARALLEL

TECHNICAL FIELD

The present invention relates generally to the field of speech recognition, and more particularly to systems for speech recognition signal processing and analysis.

BACKGROUND

Modern human communication increasingly relies on the transmission of digital representations of acoustic speech over large distances. This digital representation contains only a fraction of the information about the human voice, and yet humans are perfectly capable of understanding a digital speech signal.

Some communication systems, such as automated telephone attendants and other interactive voice response systems (IVRs), rely on computers to understand a digital speech signal. Such systems recognize the sounds as well as the meaning inherent in human speech, thereby extracting the speech content of a digitized acoustic signal. In the medical and health care fields, correctly extracting speech content from a digitized acoustic signal can be a matter of life or death, making accurate signal analysis and interpretation particularly important.

One approach to analyzing a speech signal to extract speech content is based on modeling the acoustic properties of the vocal tract during speech production. Generally, during speech production, the configuration of the vocal tract determines an acoustic speech signal made up of a set of speech resonances. These speech resonances can be analyzed to extract speech content from the speech signal.

In order to determine accurately the acoustic properties of the vocal tract during speech production, both the frequency and the bandwidth of each speech resonance are required. Generally, the frequency corresponds to the size of the cavity within the vocal tract, and the bandwidth corresponds to the acoustic losses of the vocal tract. Together, these two parameters determine the formants of speech.

During speech production, speech resonance frequency and bandwidth may change quickly, on the order of a few milliseconds. In most cases, the speech content of a speech signal is a function of sequential speech resonances, so the changes in speech resonances must be captured and analyzed at least as quickly as they change. As such, accurate speech analysis requires simultaneous determination of both the frequency and bandwidth of each speech resonance on the same time scale as speech production, that is, on the order of a few milliseconds. However, the simultaneous determination of frequency and bandwidth of speech resonances on this time scale has proved difficult.

Some previous work in formant estimation has been concerned with finding only the frequency of speech resonances in speech signals. These frequency-oriented methods use the instantaneous frequency for high time-resolution frequency estimates. However, these methods for frequency estimation are limited in flexibility, and do not fully describe the speech resonances.

For example, Nelson, et al., have developed a number of methods, including U.S. Pat. No. 6,577,968 for a "Method of estimating signal frequency," on Jun. 10, 2003, by Douglas J. Nelson; U.S. Pat. No. 7,457,756 for a "Method of generating time-frequency signal representation preserving phase information," on Nov. 25, 2008, by Douglas J. Nelson and David Charles Smith; and U.S. Pat. No. 7,492,814 for a "Method of removing noise and interference from signal using peak picking," on Feb. 17, 2009, by Douglas J. Nelson.

Generally, systems consistent with the Nelson methods ("Nelson-type systems") use instantaneous frequency to enhance the calculation of a Short-Time Fourier Transform (STFT), a common transform in speech processing. In Nelson-type systems, the instantaneous frequency is calculated as the time-derivative of the phase of a complex signal. The Nelson-type systems approach computes the instantaneous frequency from conjugate products of delayed whole spectra. Having computed the instantaneous frequency of each time-frequency element in the STFT, the Nelson-type systems approach re-maps the energy of each element to its instantaneous frequency. This Nelson-type re-mapping results in a concentrated STFT, with energy previously distributed across multiple frequency bands clustering around the same instantaneous frequency.

Auger & Flandrin also developed an approach, which is described in: F. Auger and P. Flandrin, "Improving the readability of time-frequency and time-scale representations by the reassignment method," Signal Processing, IEEE Transactions on 43, no. 5 (May 1995): 1068-1089 ("Auger/Flandrin"). Systems consistent with the Auger/Flandrin approach ("Auger/Flandrin-type systems") offer an alternative to the concentrated Short-Time Fourier Transform (STFT) of Nelson-type systems. Generally, Auger/Flandrin-type systems compute several STFTs with different windowing functions. Auger/Flandrin-type systems use the derivative of the window function in the STFT to get the time-derivative of the phase, and the conjugate product is normalized by the energy. Auger/Flandrin-type systems yield a more exact solution for the instantaneous frequency than the Nelson-type systems' approach, as the derivative is not estimated in the discrete implementation.

However, as extensions of STFT approaches, both Nelson-type and Auger/Flandrin-type systems lack the necessary flexibility to model human speech effectively. For example, the transforms of both Nelson-type and Auger/Flandrin-type systems determine window length and frequency spacing for the entire STFT, which limits the ability to optimize the filter bank for speech signals. Moreover, while both types find the instantaneous frequencies of signal components, neither type finds the instantaneous bandwidths of the signal components. As such, both the Nelson-type and Auger/Flandrin-type approaches suffer from significant drawbacks that limit their usefulness in speech processing.

Gardner and Mognasco describe an alternate approach in: T. J. Gardner and M. O. Magnasco, "Instantaneous frequency decomposition: An application to spectrally sparse sounds with fast frequency modulations," The Journal of the Acoustical Society of America 117, no. 5 (2005): 2896-2903 ("Gardner/Mognasco"). Systems consistent with the Gardner/Mognasco approach ("Gardner/Mognasco-type systems") use a highly-redundant complex filter bank, with the energy from each filter remapped to its instantaneous frequency, similar to the Nelson approach above. Gardner/Mognasco-type systems also use several other criteria to further enhance the frequency resolution of the representation.

That is, the Gardner/Mognasco-type systems discard filters with a center frequency far from the estimated instantaneous frequency, which can reduce the frequency estimation error from filters not centered on the signal component frequency. Gardner/Mognasco-type systems also use an amplitude threshold to remove low-energy frequency estimates and optimize the bandwidths of filters in a filter bank to maximize the consensus of the frequency estimates of adjacent filters. Gardner/Mognasco-type systems then use consensus as a measure of the quality of the analysis, where high consensus across filters indicates a good frequency estimate.

However, Gardner/Mognasco-type systems also suffer from significant drawbacks. First, Gardner/Mognasco-type systems do not account for instantaneous bandwidth calculation, thus missing an important part of the speech formant. Second, a consensus approach can lock in an error when a group of frequency estimates are briefly consistent with each other, but nevertheless provide inaccurate estimates of the true resonance frequency. For both of these reasons, Gardner/Mognasco-type systems offer limited usefulness in speech processing applications, particularly those applications that require higher accuracy over a short time scale.

While the above methods attempt to determine instantaneous frequency without also determining instantaneous bandwidth, Potamianos and Maragos developed a method for obtaining both the frequency and bandwidth of formants of a speech signal. The Potamianos/Maragos approach is described in: Alexandros Potamianos and Petros Maragos, "Speech formant frequency and bandwidth tracking using multiband energy demodulation," The Journal of the Acoustical Society of America 9, no. 6 (1996): 3795-3806 ("Potamianos/Maragos").

Systems consistent with the Potamianos/Maragos approach ("Potamianos/Maragos-type systems") use a filter bank of real-valued Gabor filters, and calculate the instantaneous frequency at each time-sample using an energy separation algorithm to demodulate the signal into an instantaneous frequency and amplitude envelope. In Potamianos/Maragos-type systems, the instantaneous frequency is then time-averaged to give a short-time estimate of the frequency, with a time window of about 10 ms. In Potamianos/Maragos-type systems, the bandwidth estimate is simply the standard deviation of the instantaneous frequency over the time window.

Thus, while Potamianos/Maragos-type systems offer the flexibility of a filter bank (rather than a transform), Potamianos/Maragos-type systems only indirectly estimate the instantaneous bandwidth by using the standard deviation. That is, because the standard deviation requires a time average, the bandwidth estimate in Potamianos/Maragos-type systems is not instantaneous. Because the bandwidth estimate is not instantaneous, the frequency and bandwidth estimates must be averaged over longer times than are practical for real-time speech recognition. As such, the Potamianos/Maragos-type systems also fail to determine speech formants on the time scale preferred for real-time speech processing.

SUMMARY

In brief, the disclosed method determines an instantaneous frequency and an instantaneous bandwidth of a speech resonance of a speech signal. Having received a speech signal, a reconstruction module filters the speech signal, generating a plurality of filtered signals. In each filtered signal, the real component and an imaginary component of the speech signal are reconstructed. A single-lag delay of the speech signal is also formed, based on a selected filtered signal. The estimated frequency and bandwidth of a speech resonance of the speech signal are generated based on both the selected filtered signal and the single-lag delay of the first filtered signal.

In one general aspect of the invention, a method is provided for determining an instantaneous frequency and an instantaneous bandwidth of a speech resonance of a speech signal. The method includes receiving a speech signal having a real component; filtering the speech signal so as to generate a plurality of filtered signals such that the real component and an imaginary component of the speech signal are reconstructed; and generating a first estimated frequency and a first estimated bandwidth of a speech resonance of the speech signal based on a first filtered signal of the plurality of filtered signals and a single-lag delay of the first filtered signal.

In a preferred embodiment, filtering is performed by a filter bank having a plurality of complex filters, each complex filter generating one of the plurality of filtered signals. In another preferred embodiment, the method also includes generating a plurality of estimated frequencies and a plurality of estimated bandwidths, based on the plurality of filtered signals and a plurality of single-lag delays of the plurality of filtered signals.

In yet another preferred embodiment, the filter bank includes a plurality of finite impulse response (FIR) filters. In another preferred embodiment, the filter bank includes a plurality of infinite impulse response (IIR) filters. In still another preferred embodiment, the filter bank includes a plurality of complex gammatone filters.

In still another preferred embodiment, each complex filter includes a first selected bandwidth and a first selected center frequency. In another preferred embodiment, each complex filter comprises: a selected bandwidth of a plurality of bandwidths, the plurality of bandwidths being distributed within a first predetermined range; and a selected center frequency of a plurality of center frequencies, the plurality of center frequencies being distributed within a second predetermined range.

In another preferred embodiment, each complex filter comprises a first selected bandwidth and a first selected center frequency, the first selected bandwidth and first selected center frequency being configured to optimize analysis accuracy.

In another general aspect of the invention, a method is provided for determining an instantaneous frequency and an instantaneous bandwidth of a speech resonance of a speech signal. The method includes: receiving a speech signal having a real component; filtering the speech signal so as to generate a plurality of filtered signals such that the real component and an imaginary component of the speech signal are reconstructed; forming a first integrated-product set, the forming being performed by an integration kernel, the first integrated-product set being based on a first filtered signal of the plurality of filtered signals, and the first integrated-product set having: at least one zero-lag complex product and at least one single-lag complex product; and generating, based on the first integrated-product set, a first estimated frequency and a first estimated bandwidth of a speech resonance of the speech signal. In a preferred embodiment, the integration kernel is a second order gamma IIR filter.

In another preferred embodiment, the method also includes: forming a plurality of integrated-product sets, each integrated-product set being based on one of the plurality of filtered signals, and each integrated-product set having: at least one zero-lag complex product and at least one single-lag complex product; and generating, based on the plurality of integrated-product sets, a plurality of estimated frequencies and a plurality of estimated bandwidths.

In yet another preferred embodiment, the filter bank includes a plurality of finite impulse response (FIR) filters. In another preferred embodiment, the filter bank includes a plurality of infinite impulse response (IIR) filters. In still another preferred embodiment, the filter bank includes a plurality of complex gammatone filters. In another preferred embodiment, each complex filter generates one of the plurality of filtered signals.

In still another preferred embodiment, each complex filter includes a first selected bandwidth and a first selected center frequency. In another preferred embodiment, each complex filter comprises: a selected bandwidth of a plurality of bandwidths, the plurality of bandwidths being distributed within a first predetermined range; and a selected center frequency of a plurality of center frequencies, the plurality of center frequencies being distributed within a second predetermined range. In another preferred embodiment, each complex filter comprises a first selected bandwidth and a first selected center frequency, the first selected bandwidth and first selected center frequency being configured to optimize analysis accuracy.

In yet another preferred embodiment, wherein the first filtered signal is formed by a first filter having a first selected bandwidth and a first center frequency, the method further includes generating a second estimated frequency and a second estimated bandwidth, the generating being based on a second filtered signal of the plurality of filtered signals, the second filtered signal being formed by a second filter having a second selected bandwidth and a second center frequency; and generating a third estimated bandwidth, the generating being based on: the first and second estimated frequencies, the first selected bandwidth, and the first and second center frequencies.

In still another preferred embodiment, wherein the first filtered signal is formed by a first filter having a first selected bandwidth and a first center frequency, the method further includes generating a second estimated frequency and a second estimated bandwidth, the generating being based on a second filtered signal of the plurality of filtered signals, the second filtered signal being formed by a second filter having a second selected bandwidth and a second center frequency; and generating a third estimated bandwidth, the generating being based on: the first and second estimated frequencies, the first selected bandwidth, and the first and second center frequencies; and generating a third estimated frequency, the generating being based on: the third estimated bandwidth, the first estimated frequency, the first selected frequency, and the first selected bandwidth.

In another general aspect of the invention, a method is provided for determining an instantaneous frequency and an instantaneous bandwidth of a speech resonance of a speech signal. The method includes receiving a speech signal having a real component. The speech signal is filtered so as to generate a plurality of filtered signals such that the real component and an imaginary component of the speech signal are reconstructed. A first integrated-product set is formed by an integration kernel, the first integrated-product set being based on a first filtered signal of the plurality of filtered signals. The first integrated-product set has at least one zero-lag complex product and at least one two-or-more-lag complex product. Based on the first integrated-product set, a first estimated frequency and a first estimated bandwidth of a speech resonance of the speech signal are generated.

In a preferred embodiment, the method includes forming a plurality of integrated-product sets, each integrated-product set being based on one of the plurality of filtered signals, and each integrated-product set having: at least one zero-lag complex product, and at least one two-or-more-lag complex product. Based on the plurality of integrated-product sets, a plurality of estimated frequencies and a plurality of estimated bandwidths are generated.

In another preferred embodiment, filtering is performed by a filter bank having a plurality of finite impulse response (FIR) filters. In yet another preferred embodiment, filtering is performed by a filter bank having a plurality of infinite impulse response (IIR) filters. In still another preferred embodiment, filtering is performed by a filter bank having a plurality of complex gammatone filters. In yet another preferred embodiment, filtering is performed by a filter bank having a plurality of complex filters, each complex filter generating one of the plurality of filtered signals.

In still another preferred embodiment, filtering is performed by a filter bank having a plurality of complex filters, each complex filter having a first selected bandwidth and a first selected center frequency. In yet another preferred embodiment, filtering is performed by a filter bank having a plurality of complex filters. In one preferred embodiment, each complex filter has a selected bandwidth of a plurality of bandwidths, the plurality of bandwidths being distributed within a first predetermined range, and a selected center frequency of a plurality of center frequencies, the plurality of center frequencies being distributed within a second predetermined range. In another preferred embodiment, each complex filter has a selected bandwidth of a plurality of bandwidths, the selected bandwidth being configured to optimize analysis accuracy, and a selected center frequency of a plurality of center frequencies, the selected center frequency being configured to optimize analysis accuracy.

In another general aspect of the invention, a method is provided for determining an instantaneous frequency and an instantaneous bandwidth of a speech resonance of a speech signal. The method includes generating a first estimated frequency and a first estimated bandwidth of the speech resonance based on a first filtered signal, the first filtered signal being formed by a first complex filter having a first selected bandwidth and a first center frequency. The method includes generating a second estimated frequency and a second estimated bandwidth of the speech resonance based on a second filtered signal, the second filtered signal being formed by a second complex filter having a second selected bandwidth and a second center frequency. The method also includes generating a third estimated bandwidth of the speech resonance, the generating being based on: the first and second estimated frequencies, the first selected bandwidth, and the first and second center frequencies.

In a preferred embodiment, the method includes generating a third estimated frequency of the speech resonance, the generating being based on: the third estimated bandwidth, the first estimated frequency, the first center frequency, and the first selected bandwidth.

In another general aspect of the invention, an apparatus is presented, the apparatus configured for determining an instantaneous frequency and an instantaneous bandwidth of a speech resonance of a speech resonance signal. The apparatus includes a reconstruction module configured to receive a speech resonance signal having a real component. The reconstruction module is further configured to filter the speech resonance signal so as to generate a plurality of filtered signals such that the real component and an imaginary component of the speech resonance signal are reconstructed. An estimator module couples to the reconstruction module, the estimator module being configured to generate a first estimated frequency and a first estimated bandwidth of a speech resonance of the speech resonance signal based on a first filtered signal of the plurality of filtered signals and a single-lag delay of the first filtered signal.

In a preferred embodiment, the reconstruction module includes a filter bank having a plurality of complex filters, and each complex filter is configured to generate one of the plurality of filtered signals. In another preferred embodiment, the estimator module is further configured to generate a plurality of estimated frequencies and a plurality of estimated bandwidths, based on the plurality of filtered signals and a plurality of single-lag delays of the plurality of filtered signals.

In still another preferred embodiment, the reconstruction module includes a plurality of finite impulse response (FIR) filters. In another preferred embodiment, the reconstruction module includes a plurality of infinite impulse response (IIR) filters. In another preferred embodiment, the reconstruction module includes a plurality of complex gammatone filters.

In yet another preferred embodiment, the reconstruction module includes a plurality of complex filters, each complex filter having a first selected bandwidth and a first selected center frequency. In another preferred embodiment, each complex filter comprises: a selected bandwidth of a plurality of bandwidths, the plurality of bandwidths being distributed within a first predetermined range; and a selected center frequency of a plurality of center frequencies, the plurality of center frequencies being distributed within a second predetermined range. In another preferred embodiment, each complex filter comprises: a first selected bandwidth and a first selected center frequency, the first selected bandwidth and first selected center frequency being configured to optimize analysis accuracy.

BRIEF DESCRIPTION OF THE DRAWINGS

The embodiments described herein will be more fully understood by reference to the detailed description, in conjunction with the following figures, wherein.

DETAILED DESCRIPTION

Figure 1A:
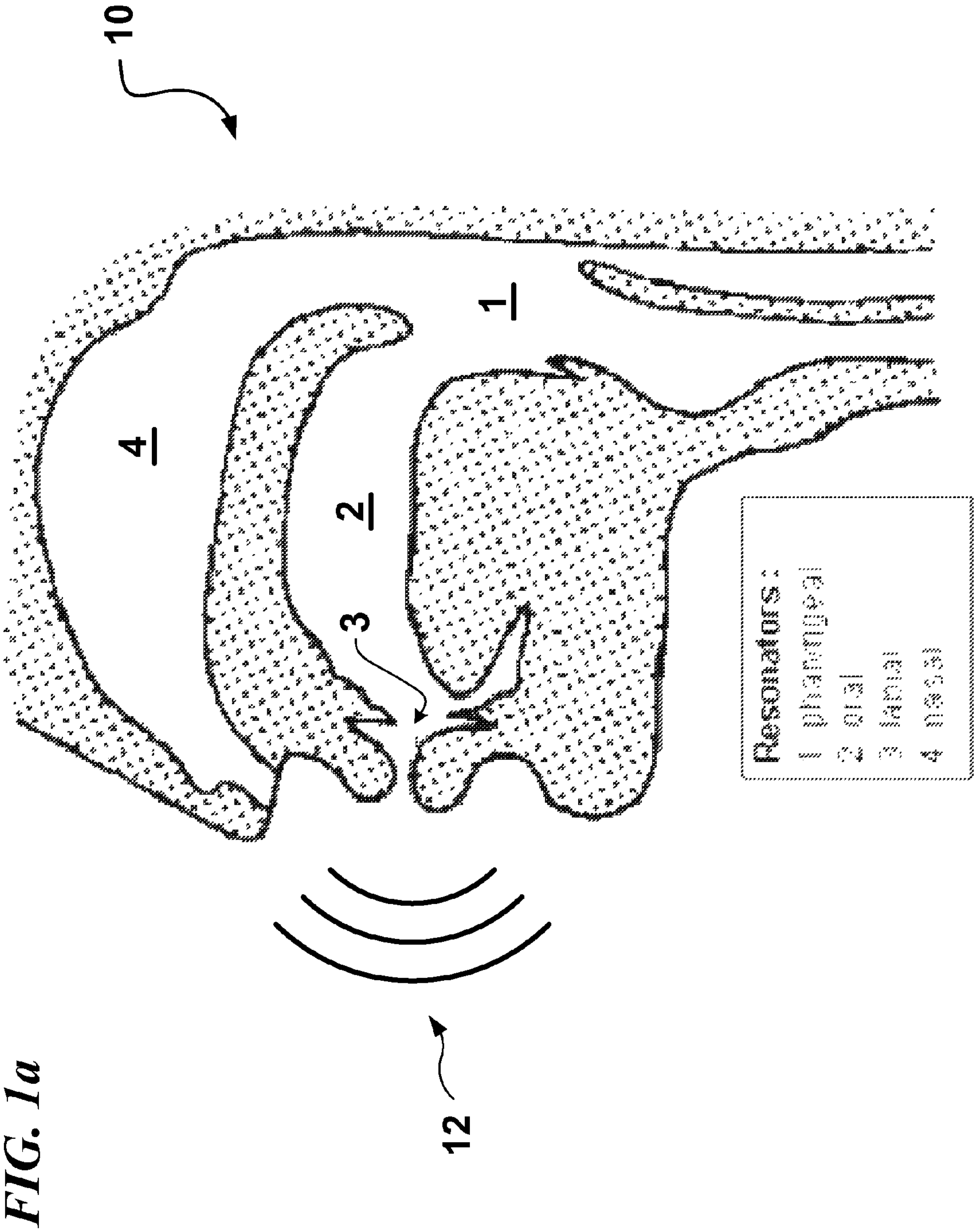
FIG. 1*a* is a cutaway view of a human vocal tract.

FIG. 1*a* illustrates a cutaway view of a human vocal tract 10. As shown, vocal tract 10 produces an acoustic wave 12. The qualities of acoustic wave 12 are determined by the configuration of vocal tract 10 during speech production. Specifically, as illustrated, vocal tract 10 includes four resonators 1, 2, 3, 4 that each contribute to generating acoustic wave 12. The four illustrated resonators are the pharyngeal resonator 1, the oral resonator 2, the labial resonator 3, and the nasal resonator 4. All four resonators, individually and together, create speech resonances during speech production. These speech resonances contribute to form the acoustic wave 12.

Figure 1B:
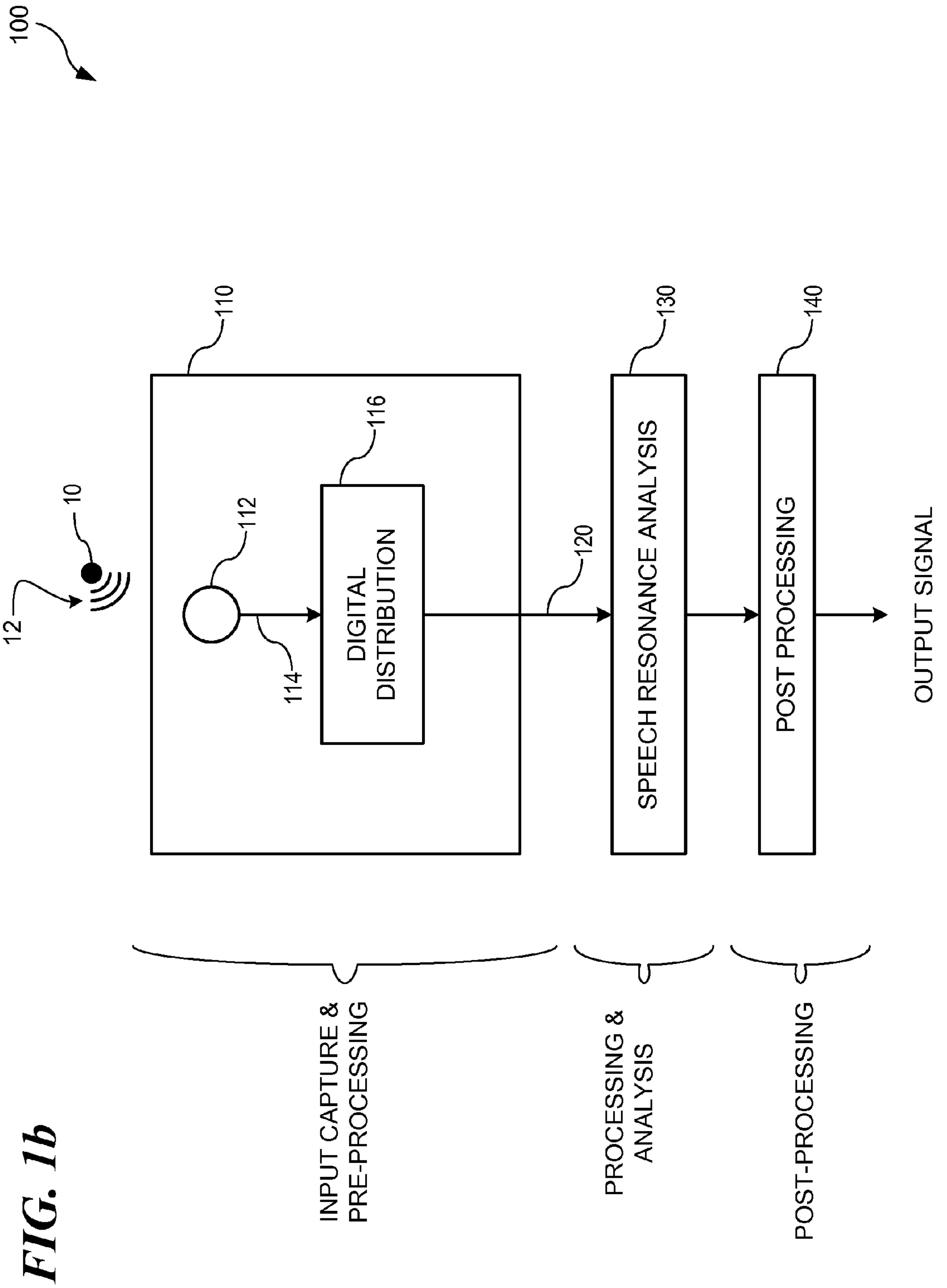
FIG. 1*b* is a high-level block diagram of a speech processing system that includes a complex acoustic resonance speech analysis system.

FIG. 1*b* illustrates an example of a speech processing system 100, in accordance with one embodiment of the invention. Broadly, speech processing system 100 operates in three general stages, "input capture and pre-processing," "processing and analysis," and "post-processing." Each stage is described in additional detail below.

To analyze and interpret a speech signal, some speech must first be captured. The first stage is therefore, generally, "input capture and pre-processing." As illustrated, speech processing system 100 is configured to capture acoustic wave 12, originating from vocal tract 10. As described above, a human vocal tract generates resonances in a variety of locations. In this stage, vocal tract 10 generates acoustic wave 12. Input processing module 110 detects, captures, and converts acoustic wave 12 into a digital speech signal.

More specifically, an otherwise conventional input processing module 110 captures the acoustic wave 12 through an input port 112. Input port 112 is an otherwise conventional input port and/or device, such as a conventional microphone or other suitable device. Input port 112 captures acoustic wave 12 and creates an analog signal 114 based on the acoustic wave.

Input processing module 110 also includes a digital distribution module 116. In one embodiment, digital distribution module 116 is an otherwise conventional device or system configured to digitize and distribute an input signal. As shown, digital distribution module 116 receives analog signal 114 and generates an output signal 120. In the illustrated embodiment, the output signal 120 is the output of input processing module 110.

The speech resonance analysis module 130 of the invention described herein receives the speech signal 120, forming an output signal suitable for additional speech processing by post processing module 140. As described in more detail below, speech resonance analysis module 130 reconstructs the speech signal 120 into a complex speech signal. Using the reconstructed complex speech signal, speech resonance analysis module 130 estimates the frequency and bandwidth of speech resonances of the complex speech signal, and can correct or further process the signal to enhance accuracy.

Speech resonance analysis module 130 passes its output to a post processing module 140, which can be configured to perform a wide variety of transformations, enhancements, and other post-processing functions. In some embodiments, post processing module 140 is an otherwise conventional post-processing module. The following figures provide additional detail describing the invention.

Figure 2:
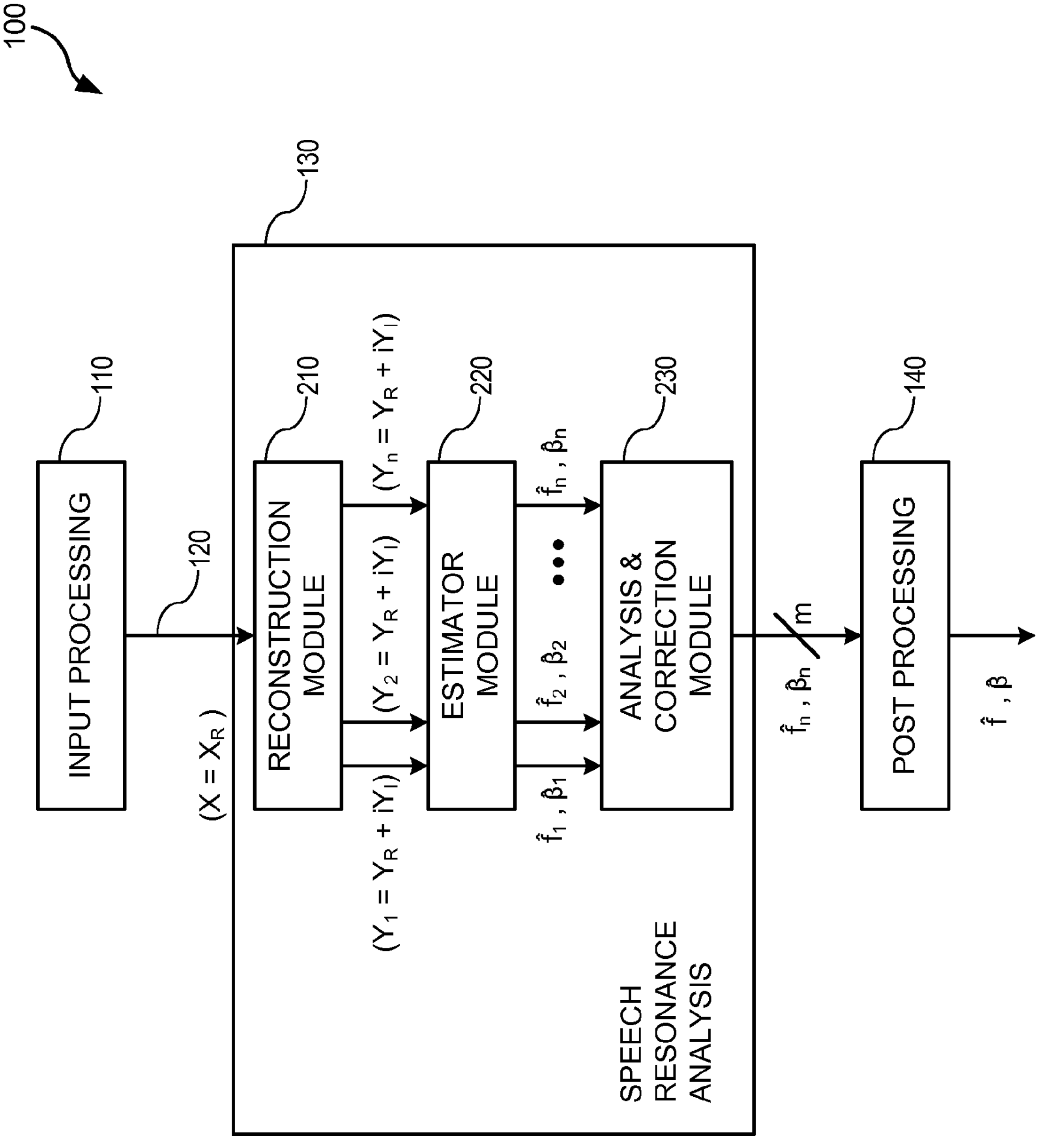
FIG. 2 is a block diagram of an embodiment of the speech processing system of FIG. 1*b*, highlighting signal transformation and process organization.

FIG. 2 presents the processing and analysis stage in a representation capturing three broad sub-stages: reconstruction, estimation, and analysis/correction. Specifically, FIG. 2 shows another view of system 100. Input processing module 110 receives a real, analog, acoustic signal (i.e., a sound, speech, or other noise), captures the acoustic signal, converts it to a digital format, and passes the resultant speech signal 120 to speech resonance analysis module 130.

One skilled in the art will understand that an acoustic resonance field such as human speech can be modeled as a complex signal, and therefore can be described with a real component and an imaginary component. Generally, the input to input processing module 110 is a real, analog signal from, for example, the point 10 representing the vocal tract of FIG. 1, having lost the complex information during transmission. As shown, the output signal of module 110, speech signal 120 (shown as X), is a digital representation of the analog input signal, and lacks some of the original signal information.

Speech signal 120 (signal X) Is the input to the three stages of processing of the invention disclosed herein, referred to herein as "speech resonance analysis." Specifically, reconstruction module 210 receives and reconstructs signal 120 such that the imaginary component and real components of each resonance are reconstructed. This stage is described in more detail below with respect to FIGS. 3 and 4. As shown, the output of reconstruction module 210 is a plurality of reconstructed signals $Y_n$, which each include a real component, $Y_R$, and an imaginary component, $Y_I$.

The output of the reconstruction module 210 is the input to the next broad stage of processing of the invention disclosed herein. Specifically, estimator module 220 receives signals $Y_n$, which is the output of the reconstruction stage. Very generally, estimator module 220 uses the reconstructed signals to estimate the instantaneous frequency and the instantaneous bandwidth of one or more of the individual speech resonances of the reconstructed speech signal. This stage is described in more detail below with respect to FIG. 3. As shown, the output of estimator module 220 is a plurality of estimated frequencies ($\hat{f}_{1 \ldots n}$) and estimated bandwidths ($\hat{\beta}_{1 \ldots n}$).

The output of the estimator module 220 is the input to the next broad stage of processing of the invention disclosed herein. Specifically, analysis & correction module 230 receives the plurality of estimated frequencies and bandwidths that are the output of the estimation stage. Very generally, module 230 uses the estimated frequencies and bandwidths to generate revised estimates. In one embodiment, the revised estimated frequencies and bandwidths are the result of novel corrective methods of the invention. In an alternate embodiment, the revised estimated frequencies and bandwidths, themselves the result of novel estimation and analysis methods, are passed to a post-processing module 140 for further refinement. This stage is described in more detail with respect to FIG. 3.

Generally, as described in more detail below, the output of the analysis and correction module 230 provides significant improvements over prior art systems and methods for estimating speech resonances. Configured in accordance with the invention described herein, a speech processing system can produce, and operate on, more accurate representations of human speech. Improved accuracy in capturing these formants results in better performance in speech applications relying on those representations.

More particularly, the invention presented herein determines individual speech resonances with a multi-channel, parallel processing chain that uses complex numbers throughout. Based on the properties of acoustic resonances, the invention is optimized to extract the frequency and bandwidth of speech resonances with high time-resolution.

Figure 3:
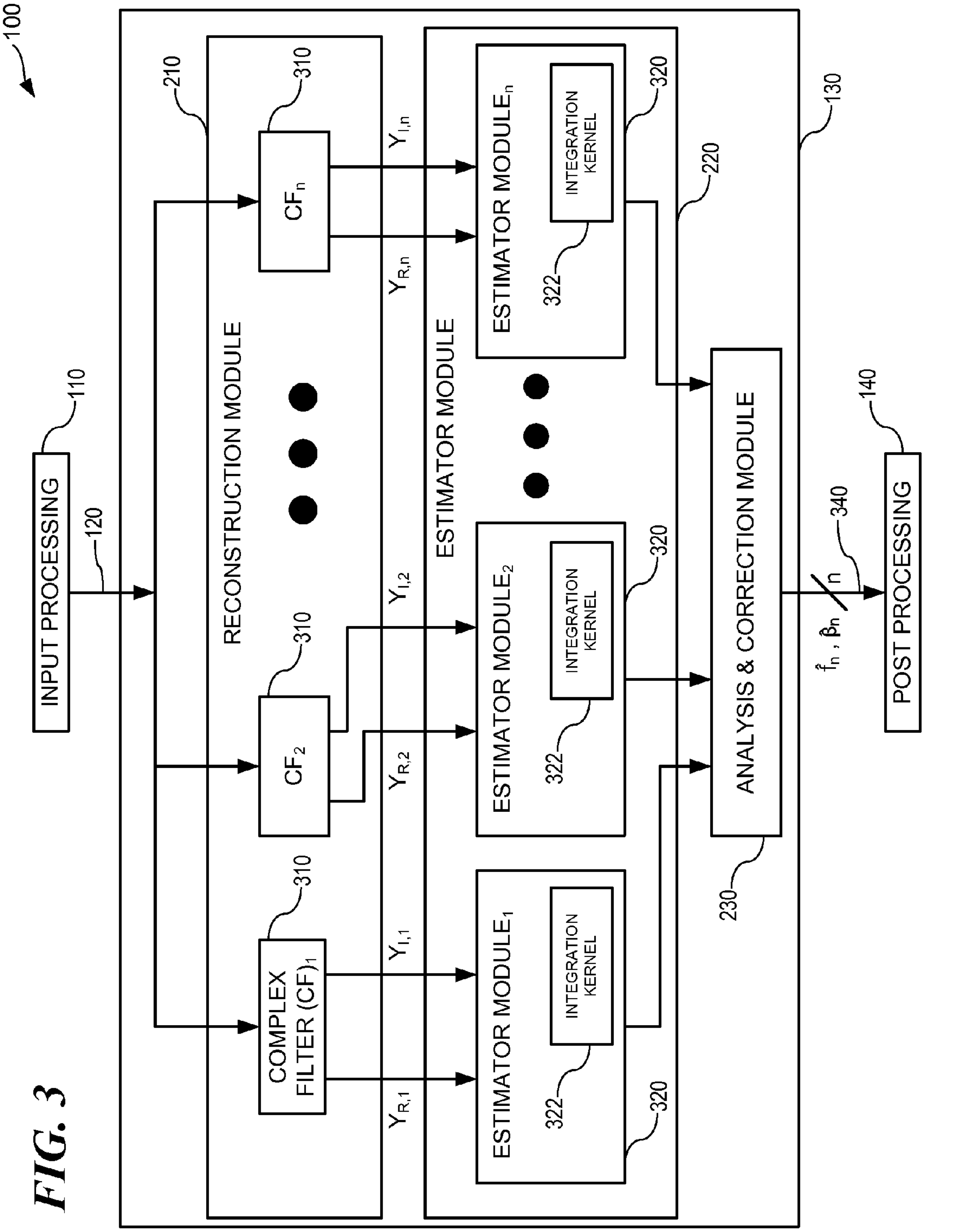
FIG. 3 is a block diagram of an embodiment of a speech resonance analysis module of the speech processing system of FIG. 2.

FIG. 3 illustrates one embodiment of the invention in additional detail. Generally, speech recognition system 100 includes input processing module 110, which is configured to generate speech signal 120, as described above. As illustrated, reconstruction module 210 receives speech signal 120. In one embodiment, speech signal 120 is a digitized speech signal from a microphone or network source. In one embodiment, speech signal 120 is relatively low in accuracy and sampling frequency, e.g., 8-bit sampling. Reconstruction module 210 reconstructs the acoustic speech resonances using a general model of acoustic resonance.

For example, an acoustic resonance can be mathematically modeled as a complex exponential:

$$r(t)=e^{-2\pi\cdot\beta\cdot t}e^{-i2\pi\cdot f\cdot t},\ \text{for } t>0$$

Where β is the frequency of the resonance (in Hertz), and is the bandwidth (in Hertz). By convention, β is approximately the measureable full-width-at-half-maximum bandwidth. Further, complex sound transmission can be well described by a (real) sine wave. The signal capture process is thus the equivalent of taking the real (or imaginary) part of the complex source, which, however, also loses instantaneous information. As described in more detail below, reconstruction module 210 recreates the original complex representation of the acoustic speech resonances.

In the illustrated embodiment, reconstruction module 210 includes a plurality of complex filters (CFs) 310. One embodiment of a complex filter 310 is described in more detail with respect to FIG. 4, below. Generally, reconstruction module 210 produces a plurality of reconstructed signals, $Y_n$, each of which includes a real part ($Y_R$) and an imaginary part ($Y_I$).

As shown, system 100 includes an estimator module 220, which in the illustrated embodiment includes a plurality of estimator modules 320, each of which is configured to receive a reconstructed signal $Y_n$. In the illustrated embodiment, each estimator module 320 includes an integration kernel 322. In an alternate embodiment, module 220 includes a single estimator module 320, which can be configured with one or more integration kernels 322. In an alternate embodiment, estimator module 320 does not include an integration kernel 322.

Generally, estimator modules 320 generate estimated instantaneous frequencies and bandwidths based on the reconstructed signals using the properties of an acoustic resonance. The equation for a complex acoustic resonance described above can be reduced to a very simple form:

$$r(t)=e^{-at},\ \text{with } a=2\pi\beta t+i2\pi f \tag{0.2}$$

for a resonance at frequency f, with bandwidth β. An equation of the family $e^{-at}$ can also be modeled by a difference equation, $$y[t]=(1-a)\cdot y[t-1]+x[t] \tag{0.3}$$

for a forcing function x. And if x(t)is zero, as in a ringing response of the vocal tract resonances to an impulse from the glottal pulse, for example, in one embodiment, system 100 can determine the coefficient a based on two samples of a reconstructed resonance y, and from the coefficient a, the frequency and bandwidth can be estimated, as described in more detail below. In an alternate embodiment, also described in more detail below, where x is variable, or in noisy operating environment, system 100 can calculate auto-regression results to determine the coefficient a.

In the illustrated embodiment, each estimator module 320 passes the results of its frequency and bandwidth estimation to analysis and correction module 230. Generally, module 230 receives a plurality of instantaneous frequency and bandwidth estimates and corrects these estimates, based on certain configurations, described in more detail below.

As shown, module 130 produces an output 340, which, in one embodiment, system 100 sends to post processing module 140 for additional processing. In the embodiment, output 340 is a plurality of frequencies and bandwidths.

Thus, generally, system 100 receives a speech signal including a plurality of speech resonances, reconstructs the speech resonances, estimates their instantaneous frequency and bandwidth, and passes processed instantaneous frequency and bandwidth information on to a post-processing module for further processing, analysis, and interpretation. As described above, the first phase of analysis and processing is reconstruction, shown in more detail of one embodiment in FIG. 4.

Figure 4:
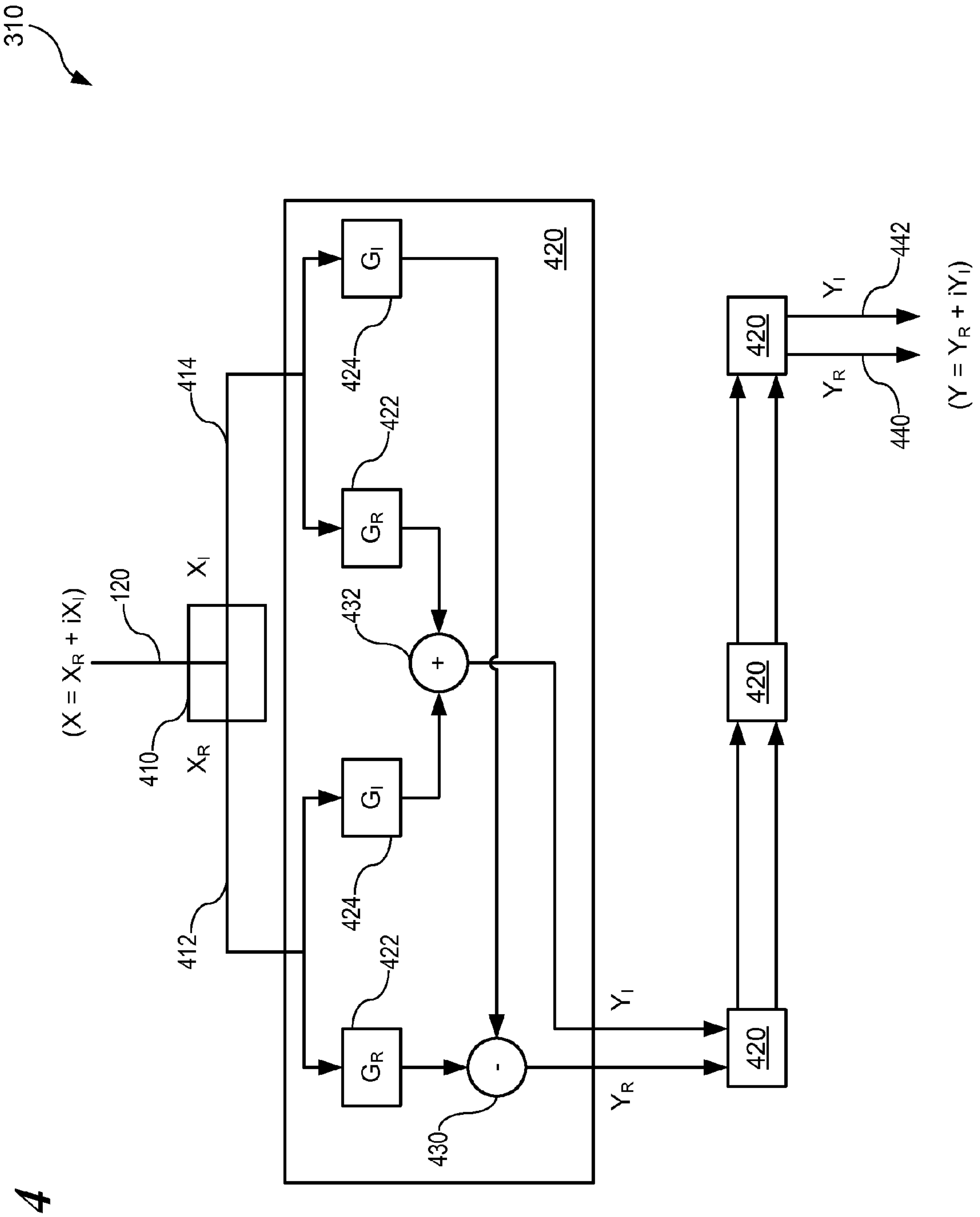
FIG. 4 is a block diagram of an embodiment of a complex gammatone filter of a speech resonance analysis module.

FIG. 4 is a block diagram illustrating operation of a complex gammatone filter 310 in accordance with one embodiment. Specifically, filter 310 receives input speech signal 120, divides speech signal 120 into two secondary input signals 412 and 414, and passes the secondary input signals 412 and 414 through a series of filters 420. In the illustrated embodiment, filter 310 includes a single series of filters 420. In an alternate embodiment, filter 310 includes one or more additional series of filters 420, arranged (as a series) in parallel to the illustrated series.

In the illustrated embodiment, the series of filters 420 is four filters long. So configured, the first filter 420 output serves as the input to the next filter 420, which output serves as the input to the next filter 420, and so forth.

In one embodiment, each filter 420 is a complex quadrature filter consisting of two filter sections 422 and 424. In the illustrated embodiment, filter 420 is shown with two sections 422 and two sections 424. In an alternate embodiment, filter 420 includes a single section 422 and a single section 424, each configured to operate as described below. In one embodiment, each filter section 422 and 424 is a circuit configured to perform a transform on its input signal, described in more detail below. Each filter section 422 and 424 produces a real number output, one of which applies to the real part of the filter 420 output, and the other of which applies to the imaginary part of the filter 420 output.

In one embodiment, filter 420 is a finite impulse response (FIR) filter. In one embodiment, filter 420 is an infinite impulse response (IIR) filter. In a preferred embodiment, the series of four filters 420 is a complex gammatone filter, which is a fourth-order gamma function envelope with a complex exponential. In an alternate embodiment, reconstruction module 310 is configured with other orders of the gamma function, corresponding to the number of filters 420 in the series.

Generally, the fourth-order gammatone filter impulse response is a function of the following terms:

$g_n(t)$=Complex gammatone filter n $b_n$=Bandwidth parameter of filter n $f_n$=Center frequency of filter n and is given by:

$$g_n(t)=t^3e^{-2\pi\cdot b_n\cdot t}e^{-2\pi\cdot f_n\cdot t},\text{ for t>0} \tag{0.4}$$

As such, in one embodiment, the output of filter 420 is an output of N complex numbers at the sampling frequency. Accordingly, the use of complex-valued filters eliminates the need to convert a real-valued input single into its analytic representation, because the response of a complex filter to a real signal is also complex. Thus, filter 310 provides a distinct processing advantage as filter 420 can be configured to unify the entire process in the complex domain.

Moreover, each filter 420 can be configured independently, with a number of configuration options, including the filter functions, filter window functions, filter center frequency, and filter bandwidth for each filter 420. In one embodiment, the filter center frequency and/or filter bandwidth are selected from a predetermined range of frequencies and/or bandwidths. In one embodiment, each filter 420 is configured with the same functional form. In a preferred embodiment, each filter is configured as a fourth-order gamma envelope.

In one embodiment, each filter 420 filter bandwidth and filter spacing are configured to optimize overall analysis accuracy. As such, the ability to specify the filter window function, center frequency, and bandwidth of each filter individually contributes significant flexibility in optimizing filter 310, particularly so as to analyze speech signals. In the preferred embodiment, each filter 420 is configured with 2% center frequency spacing and filter bandwidth of three-quarters of the center frequency (with saturation at 500 Hz). In one embodiment, filter 310 is a fourth-order complex gammatone filter, implemented as a cascade of first-order gammatone filters 420 in quadrature.

The following is a mathematic justification for using a cascade of first-order gammatone filters to create a fourth-order gammatone filter. For a complex input $x=x_R+ix_I$, the complex kernel of the first-order complex gammatone filter 420 can be represented as $g=g_R+ig_I$, where, $$g_R(\tau)=e^{-2\pi b\tau}\cos 2\pi f\tau$$

$$g_I(\tau)=e^{-2\pi b\tau}\sin 2\pi f\tau \tag{0.5}$$

In one embodiment, filter sections 422 and 424 are configured respectively, with input signal s, as follows:

$$G_R(s)=\int g_R(\tau)s(t-\tau)d\tau$$

$$G_I(s)=\int g_I(\tau)s(t-\tau)d\tau \tag{0.6}$$

which, when combined, perform a first-order complex gammatone filter with output $y=y_R+iy_I$:

$$y_R(t)=G_R(x_R)-G_I(x_I)$$

$$y_I(t)=G_I(x_R)+G_R(x_I) \tag{0.7}$$

As such, in one embodiment, a fourth-order complex gammatone filter is four iterations of the first-order filter 420:

$$G_4(x)=G_1\circ G_1\circ G_1\circ G_1(x) \tag{4.4}$$

In the illustrated embodiment, for example, each filter 420 is configured as a first order gammatone filter. Specifically, filter 310 receives an input signal 120, and splits the received signal into designated real and imaginary signals. In the illustrated embodiment, splitter 410 splits signal 120 into a real signal 412 and an imaginary signal 414. In an alternate embodiment, splitter 410 is omitted and filter 420 operates on signal 120 directly. In the illustrated embodiment, both real signal 412 and "imaginary" signal 414 are real-valued signals, representing the complex components of input signal 120.

In the illustrated embodiment, real signal 412 is the input signal to a real filter section 422 and an imaginary filter 424. In the illustrated embodiment, section 422 calculates $G_R$ from signal 412 and section 424 calculates $G_I$ from signal 412. Similarly, imaginary signal 414 is the input signal to a real filter section 422 and an imaginary filter section 424. In the illustrated embodiment, section 422 calculates $G_R$ from signal 414 and section 424 calculates $G_I$ from signal 414.

As shown, filter 420 combines the outputs from sections 422 and 424. Specifically, filter 420 includes a signal subtractor 430 and a signal adder 432. In the illustrated embodiment, subtractor 430 and adder 432 are configured to subtract or add the signal outputs from sections 422 and 424. One skilled in the art will understand that there are a variety of mechanisms suitable for adding and/or subtracting two signals. As shown, subtractor 430 is configured to subtract the output of imaginary filter section 424 (to which signal 414 is input) from the output of real filter section 422 (to which signal 412 is input). The output of subtractor 430 is the real component, $Y_R$, of the filter 420 output.

Similarly, adder 432 is configured to add the output of imaginary filter section 424 (to which signal 412 is input) to the output of real filter section 422 (to which signal 414 is input). The output of adder 432 is the real value of the imaginary component, $Y_I$, of the filter 420 output. As shown, module 400 includes four filters 420, the output of which is a real component 440 and an imaginary component 442. As described above, real component 440 and imaginary component 442 are passed to an estimator module for further processing and analysis.

Returning now to FIG. 3, in the illustrated embodiment of system 100, estimator module 220 includes a plurality of estimator modules 320. As described above, each estimator module 320 receives a real component ($Y_R$) and a (real-valued) imaginary component ($Y_I$) from reconstruction module 310. In one embodiment, each estimator module 320 receives or is otherwise aware of the configuration of the particular complex filter 310 that generated the input to that estimator module 320. In one embodiment, each estimator module 320 is associated with a complex filter 310, and is aware of the configuration setting of the complex filter 310, including the filter function(s), filter center frequency, and filter bandwidth.

In the illustrated embodiment, each estimator module 320 also includes an integration kernel 322. In an alternate embodiment, each estimator module 320 operates without an integration kernel 322. In one embodiment, at least one integration kernel 322 is a second order gamma IIR filter. Generally, each integration kernel 322 is configured to receive real and imaginary components as inputs, and to calculate zero-lag delays and variable-lag delays based on the received inputs.

Each estimator module 320 uses variable-delays of the filtered signals to form a set of products to estimate the frequency and bandwidth using methods described below. There are several embodiments of the estimator module 320; for example, the estimator module 320 may contain an integration kernel 322, as illustrated. For clarity, three alternative embodiments of the system with increasing levels of complexity are introduced here.

In the first embodiment, each estimator module 320 generates an estimated frequency and an estimated bandwidth of a speech resonance of the input speech signal 120 without an integration kernel 322. The estimated frequency and bandwidth are based only on the current filtered signal output from the CF 310 associated with that estimator module 320, and a single-lag delay of that filtered signal output. In one embodiment, the plurality of filters 310 and associated estimator modules 320 generate a plurality of estimated frequencies and bandwidths at each time sample.

In a second embodiment, each estimator module 320 includes an integration kernel 322, which forms an integrated-product set. Based on the integrated-product set, estimator module 320 generates an estimated frequency and an estimated bandwidth of a speech resonance of the input speech signal 120. Each integration kernel 322 forms the integrated-product set by updating products of the filtered signal output and a single-delay of the filtered signal output for the length of the integration. In one embodiment, the plurality of filters 310 and associated estimator modules 320 generate a plurality of estimated frequencies and bandwidths at each time sample, which are smoothed over time by the integration kernel 322.

In a third embodiment, the integrated-product set has an at-least-two-lag complex product, increasing the number of products in the integrated-product set. These three embodiments are described in more detail below.

In the first embodiment introduced above, estimator module 320 computes a single-lag product set using the output of a CF 310 without integration kernel 322. In this embodiment, the product set $\{y[t]y^*[t-1], |y[t]|^2\}$, where y is the complex output of CF 310, is used to find the instantaneous frequency and bandwidth of the input speech signal 102 using a single delay, extracting a single resonance at each point in time. Estimator module 320 computes the instantaneous frequency and instantaneous bandwidth with the single-lag product set using the following equations:

$$\hat{f} = 2\pi dt \cdot arg\left(\frac{y[t]y^*[t-1]}{|y[t]|^2}\right)$$

$$\hat{\beta} = -\frac{1}{2\pi dt}\ln\left(\frac{y[t]y^*[t-1]}{|y[t]|^2}\right)$$

where dt is the sampling interval. In a preferred embodiment, one or more estimator modules 320 calculate the instantaneous frequency and bandwidth from a single-lag product set based on each CF 310 output.

In alternate embodiments (e.g., the second and third embodiments introduced above), estimator module 320 computes an integrated-product set of variable delays using integration kernel 322. The integrated-product set is used to compute the instantaneous frequency and bandwidth of the speech resonances of the input speech signal 302. In a preferred embodiment, one or more estimator modules 320 calculate an integrated-product set based on each CF 310 output.

The integrated-product set of the estimator module 320 can include zero-lag products, single-lag products, and at-least-two lag products depending on the embodiment. In these embodiments, the integrated-product set is configured as an integrated-product matrix with the following definitions:

$\Phi_N(t)$=Integrated-product matrix with N delays $\phi_{m,n}(t)$=Integrated-product matrix element with delays m, n<N y=Complex-signal output of CF 310 in Reconstruction module 210 k=Integration kernel 322 within Estimator module 320

Estimator module 320 updates the elements of the integrated-product matrix at each sampling time, with time-integration performed separately for each element over a integration kernel k[τ] of length l, $$\varphi_{m,n}(t) \equiv \sum_{\tau=0}^{l} k[\tau]y[t-\tau-m]y^*[t-\tau-n]$$

The full integrated-product set with N-delays is an N+1-by-N-N+1 matrix:

$$\Phi_N = \begin{bmatrix} \varphi_{0,0} & \cdots & \varphi_{0,N} \\ & \cdots & \\ \varphi_{N,0} & \cdots & \varphi_{N,N} \end{bmatrix}$$

As such, for a maximum delay of 1 (i.e. a single-lag), the integrated product set is a 2×2 matrix:

$$\Phi_1 = \begin{bmatrix} \varphi_{0,0} & \varphi_{0,1} \\ \varphi_{1,0} & \varphi_{1,1} \end{bmatrix}$$

Accordingly, element $\phi_{0,0}$ is a zero-lag complex product and elements $\phi_{0,1}$, $\phi_{1,1}$, and, $\phi_{1,0}$ are single-lag complex products. Additionally, for a maximum delay of 2 (i.e., an at-least-two-lag), the integrated-product set is a 3×3 matrix, composed of the zero-lag and single-lag products from above, as well as an additional column and row of two-lag products: $\phi_{0,2}$, $\phi_{1,2}$, $\phi_{2,2}$, $\phi_{2,1}$, and, $\phi_{2,0}$. Generally, additional lags improve the precision of subsequent frequency and bandwidth estimates. One skilled in the art will understand that there is a computational trade-off between precision gained by additional lags and the power/time required to compute the additional elements.

In this embodiment, estimator module 320 is configured to use time-integration to calculate the integrated-product set. Generally, complex time-integration provides flexible optimization for estimates of speech resonances. For example, time-integration can be used to average resonance estimates over the glottal period to obtain more accurate resonance values, independent of glottal forcing.

Function k is chosen to optimize the signal-to-noise ratio while preserving speed of response. In a preferred embodiment, the integration kernel 322 configures k as a second-order gamma function. In one embodiment, integration kernel 322 is a second-order gamma IIR filter. In an alternate embodiment, integration kernel 322 is an otherwise conventional FIR or IIR filter.

In the second embodiment with a single-delay integrated-product set, introduced above, the estimator module 320 calculates the instantaneous frequency $\hat{f}$ and instantaneous bandwidth $\hat{\beta}$ using elements of the single-delay integrated-product matrix with the following equations:

$$\hat{f} = 2\pi dt \cdot arg(\varphi_{1,0} / \varphi_{1,1}) \qquad (0.12)$$

$$\hat{\beta} = -\frac{1}{2\pi dt}\ln(\varphi_{1,0} / \varphi_{1,1})$$

In this embodiment, $\hat{\beta}$ is the estimated bandwidth associated with a pole-model of a resonance. One skilled in the art will understand that other models can also be employed.

It is worth nothing that these equations for frequency and bandwidth estimation are equivalent to the equations in the first embodiment described above, where the integration window k is configured as a Kronecker delta function, essentially removing the integration kernel, resulting in the equivalent product matrix elements:

$$\phi_{m,n}(t) \equiv y[t-m]y^*[t-n] \qquad (0.13)$$

In the third embodiment introduced above, estimator module 320 uses an integrated product-set with additional delays to estimate the properties of more resonances per complex filter at each sample time. This can be used in detecting closely-spaced resonances.

In summary, reconstruction module 310 provides an approximate complex reconstruction of an acoustic speech signal. Estimator modules 320 use the reconstructed signals that are the output of module 310 to compute the instantaneous frequency and bandwidth of the resonance, based in part on the properties of acoustic resonance generally.

In the illustrated embodiment, analysis and correction module 330 receives the plurality of estimated frequencies and bandwidths, as well as the product sets from the estimator modules 320. Generally, analysis & correction module 330 provides an error estimate of the frequency and bandwidth calculations using regression analysis. The analysis & correction module uses the properties of the filters in recognition module 310 to produce one or more corrected frequency and bandwidth estimates 340 for further processing, analysis, and interpretation.

In one embodiment, analysis & correction module 230 processes the output of the integrated-product set as a complex auto-regression problem. That is, module 230 computes the best difference equation model of the complex acoustic resonance, adding a statistical measure of fit. More particularly, in one embodiment, analysis & correction module 230 calculates an error estimate from the estimation modules 320 using the properties of regression analysis in the complex domain with the following equation:

$$r^2 = \frac{\varphi_{0,0} - \varphi_{1,1} \cdot |\varphi_{1,0} / \varphi_{1,1}|^2}{\varphi_{0,0}}$$

The error r is a measure of the goodness-of-fit of the frequency estimate. In one embodiment, module 230 uses r to identify instantaneous frequencies resulting from noise versus those resulting from resonance. Use of this information in increasing the accuracy of the estimates is discussed below.

In addition to an error estimate, an embodiment of analysis & correction module 230 also estimates a corrected instantaneous bandwidth of a resonance by using the estimates from one or more estimator modules 320. In a preferred embodiment, module 230 estimates the corrected instantaneous bandwidth using pairs of frequency estimates, as determined by estimator modules 320 with corresponding complex filters 310 closely spaced in center frequency. Generally, this estimate better approximates the bandwidth of the resonance than the single-filter-based estimates described above.

Specifically, module 230 can be configured to calculate a more accurate bandwidth estimate using the difference in frequency estimate over the change in center frequency across two adjacent estimator modules, $$v_n = \frac{\hat{f}_{n+1} - \hat{f}_n}{f_{n+1} - f_n}$$

The corrected instantaneous bandwidth estimate from the $n^{th}$ estimator module 320, $\hat{\beta}_n$, can be estimated using the selected bandwidth of the corresponding complex filter 310, $b_n$, with the following equation:

$$\hat{\beta}_n = a_0 v_n \left( \frac{1 + a_1 v_n - a_2 v_n^2}{1 + a_3 v_n - a_4 v_n^2} \right) b_n$$

where, in one embodiment, the preferred coefficients, found empirically, are:

$a_0=6.68002$
$a_1=3.69377$
$a_2=2.87388$
$a_3=47.5236$
$a_4=42.4272$

In one embodiment, in particular where each CF 310 is a complex gammatone filter, the estimated instantaneous frequency can be skewed away from the exact value of the original resonance, in part because of the asymmetric frequency response of the complex filters 310. Thus, module 230 can be configured to use the corrected bandwidth estimate, obtained using procedures described above, to correct errors in the estimated instantaneous frequencies coming from the estimator modules 320. For example, in one embodiment, for a CF 310 with center frequency f, bandwidth b, and uncorrected frequency estimate $\hat{f}$, the best-fit equation for frequency estimate correction is:

$$\hat{f}_{corrected} = f + (1 + 3.92524 \cdot R^2) \cdot (\hat{f} - f - c_1 R^{c2} \cdot e^{-c3R})$$

where $R=\hat{\beta}/b$ is the ratio of estimated resonance bandwidth to filter bandwidth. In One embodiment, the constants are found empirically. For example, where $b<500$:

$c_1=0.059101+0.816002\cdot f$ $c_2=2.3357$ $c_3=3.58372$ and for b=500:

$$c_1 = 0.513951 + 140340.0/(-409.325 + f)$$

$$c_2 = 1.95121 + 145.771/(-292.151 + f)$$

$$c_3 = 1.72734 + 654.08/(-319.262 + f)$$

As such, analysis and correction module 230 can be configured to improve the accuracy of the estimated resonance frequency and bandwidth generated by the estimator modules 320. Thus, the improved estimates can be forwarded for speech recognition processing and interpretation, with improved results over estimates generated by prior art approaches.

For example, in one embodiment, post-processing module 140 performs thresholding operations on the plurality of estimates received from analysis & correction modules 230. In one embodiment, thresholding operations discard estimates outside a predetermined range in order to improve signal-to-noise performance. In one embodiment, module 140 aggregates the received estimates to reduce the over-determined data-set. One skilled in the art will understand that module 140 can be configured to employ other suitable post-processing operations.

Figure 5:
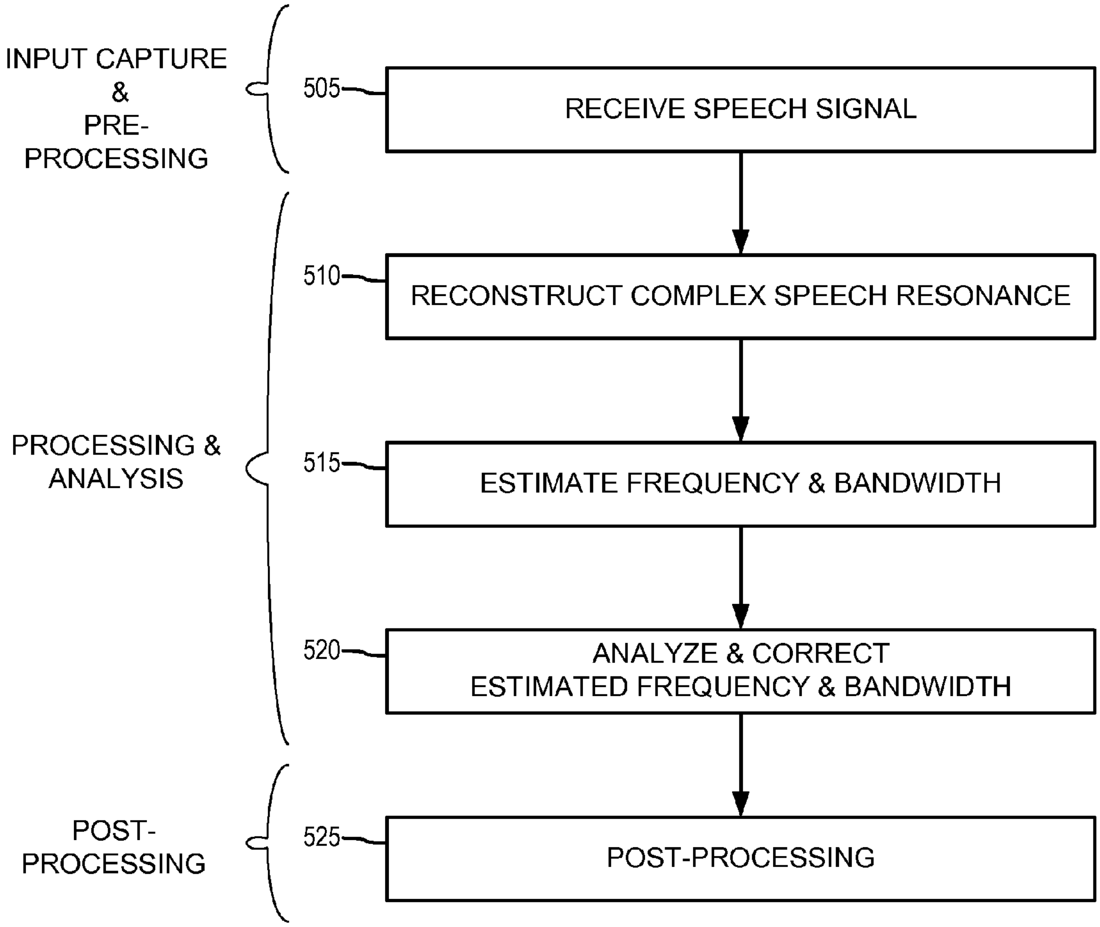
FIG. 5 is a high-level flow diagram depicting operational steps of a speech processing method.

Thus, generally, system 100 can be configured to perform all three stages of speech signal process and analysis described above, namely, reconstruction, estimation, and analysis/correction. The following flow diagrams describe these stages in additional detail. Referring now to FIG. 5, the illustrated process begins at block 505, in an input capture and pre-processing stage, wherein the speech recognition system receives a speech signal. For example, reconstruction module 210 receives a speech signal from input processing module 110 (of FIG. 2).

Next, the process enters the processing and analysis stage. Specifically, as indicated at block 510, reconstruction module 210 reconstructs the received speech signal. Next, as indicated at block 515, estimator module 220 estimates the frequency and bandwidth of a speech resonance of the reconstructed speech signal. Next, as indicated at block 520, analysis and correction module 230 performs analysis and correction operations on the estimated frequency and bandwidth of the speech resonance.

Next, the process enters the post-processing stage. Specifically, as indicated at block 525, post-processing module 140 performs post-processing on the corrected frequency and bandwidth of the speech resonance. Particular embodiments of this process are described in more detail below.

Figure 6:
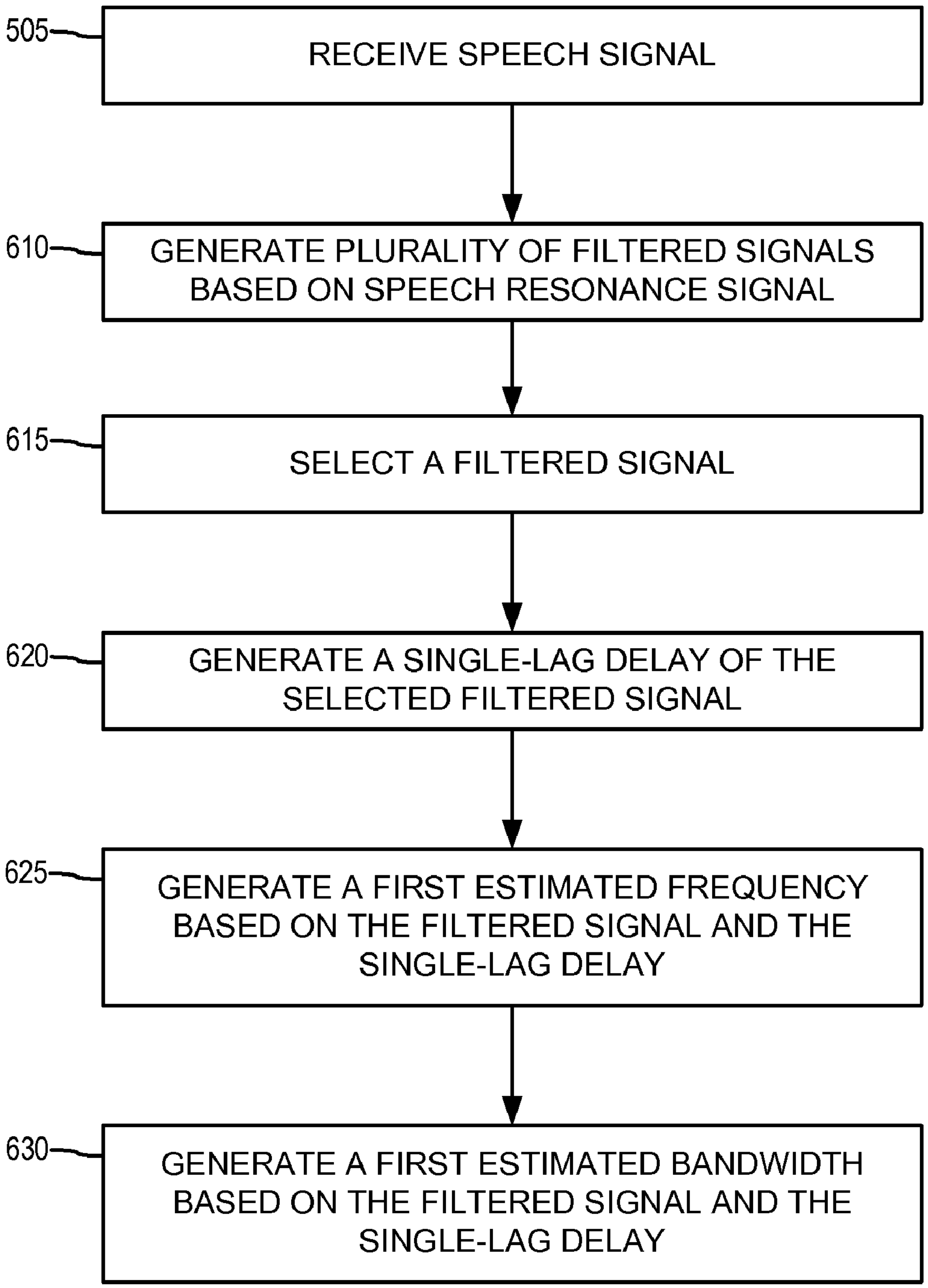
FIGS. 6-9 are high-level flow diagrams depicting operational steps of embodiments of complex acoustic speech resonance analysis methods.

Referring now to FIG. 6, the illustrated process begins at block 505, as above. Next, as indicated at block 610, reconstruction module 210 generates a plurality of filtered signals based on a speech resonance signal of the received speech signal received as described in block 505. In the preferred embodiment, each of the plurality of filtered signal is a reconstructed (real and complex) speech signal, as described above.

Next, as indicated at block 615, estimator module 220 selects one of the filtered signals generated as described in block 610. Next, as indicated at block 620, estimator module 220 generates a single-lag delay of a speech resonance of the selected filtered signal.

Next, as indicated at block 625, estimator module 220 generates a first estimated frequency of the speech resonance based on the filtered signal and the single-lag delay of the selected filtered signal. Next, as indicated at block 630, estimator module 220 generates a first estimated bandwidth of the speech resonance based on the filtered signal and the single-lag delay of the selected filtered signal. Thus, the flow diagram of FIG. 6 describes a process that generates an estimated frequency and bandwidth of a speech resonance of a speech signal.

Figure 7:
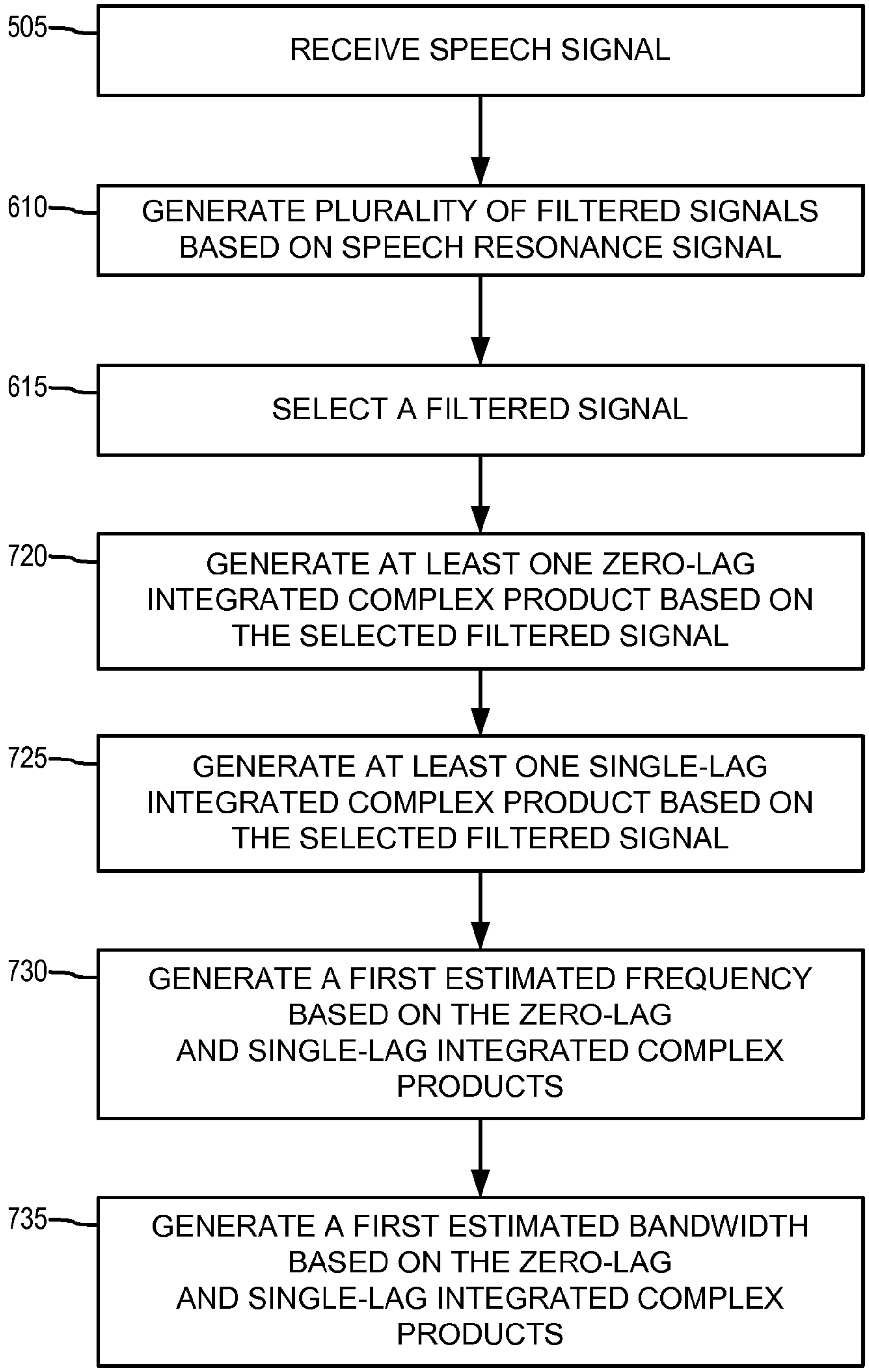

Referring now to FIG. 7, the illustrated process advances as described above as indicated in blocks 505, 610, and 615. Next, as indicated at block 720, estimator module 220 generates at least one zero-lag integrated complex product based on the filtered signal selected as described in block 615. Next, as indicated at block 725, estimator module 220 generates at least one single-lag integrated complex product based on the selected filtered signal.

Next, as indicated at block 730, estimator module 220 generates a first estimated frequency based on the zero-lag and single-lag integrated complex products. Next, as indicated at block 735, estimator module 220 generates a first estimated bandwidth based on the zero-lag and single-lag integrated complex products.

Figure 8:
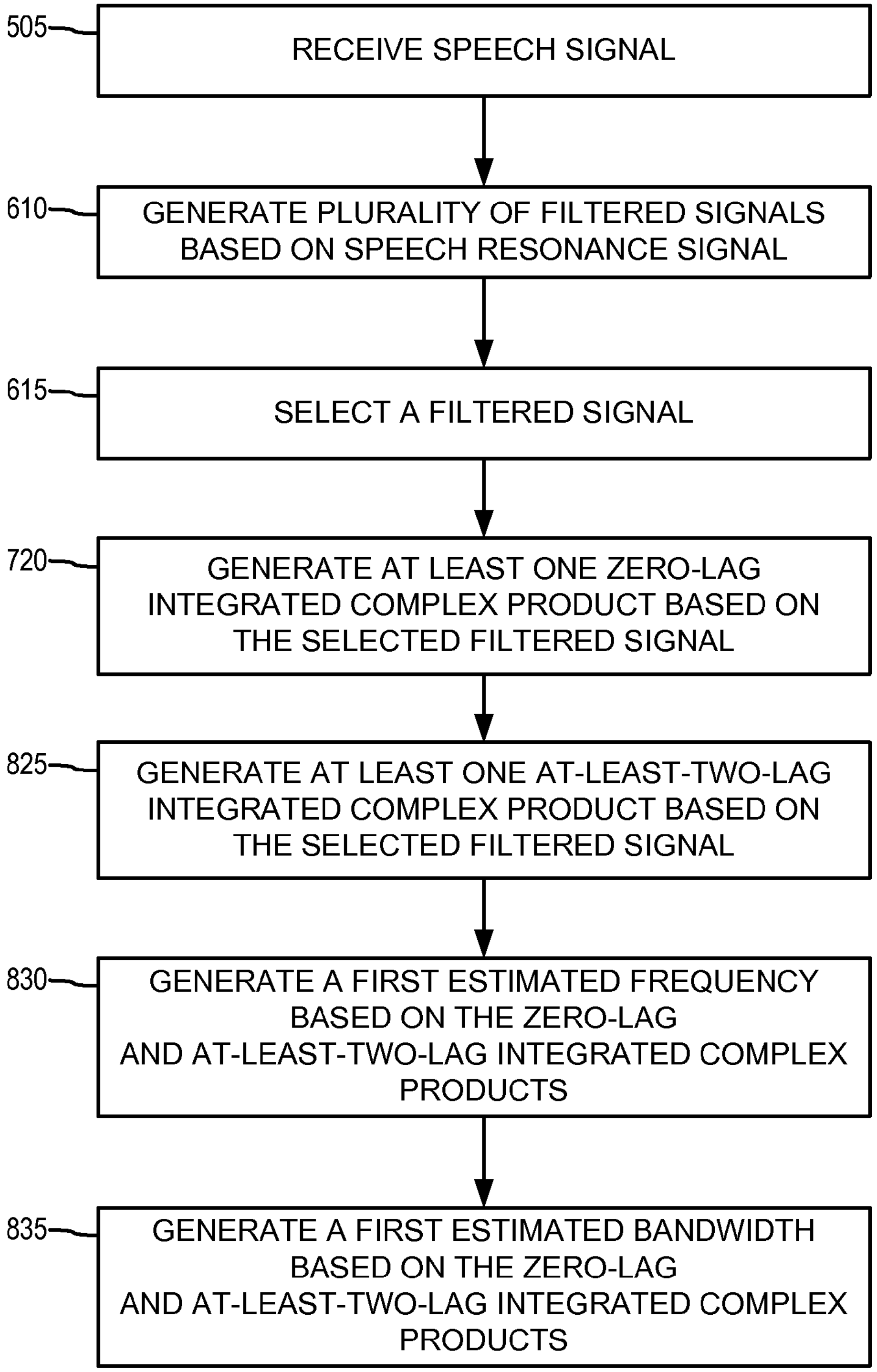

Referring now to FIG. 8, the illustrated process advances as described above as indicated in blocks 505, 610, 615, and 720. Next, as indicated at block 825, estimator module 220 generates at least one at-least-two-lag integrated complex product based on the selected filtered signal.

Next, as indicated at block 830, estimator module 220 generates a first estimated frequency based on the zero-lag and at-least-two-lag integrated complex products. Next, as indicated at block 835, estimator module 220 generates a first estimated bandwidth based on the zero-lag and at-least-two-lag integrated complex products.

Figure 9:
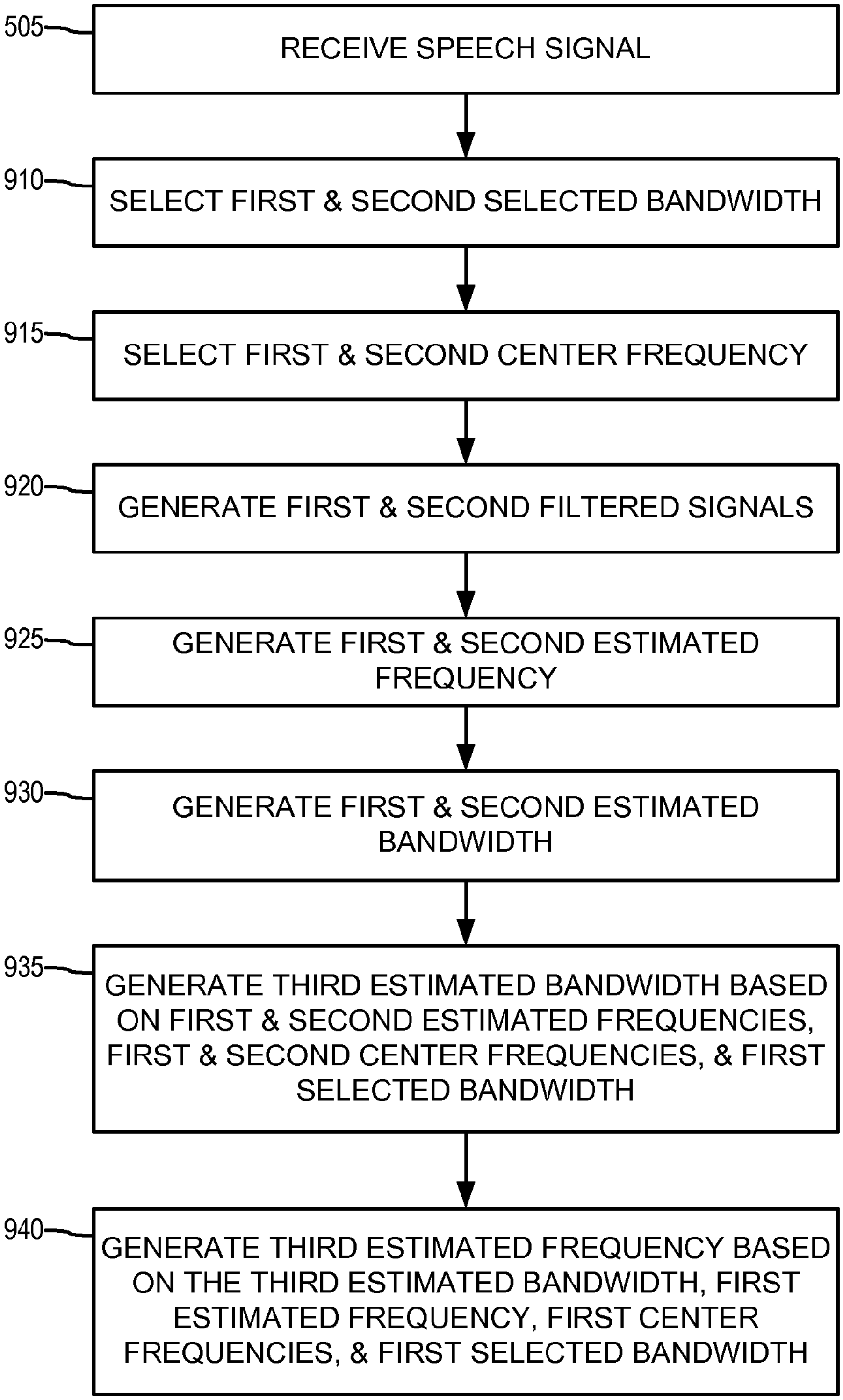

Referring now to FIG. 9, the illustrated process begins as described above as indicated in block 505. Next, as indicated at block 910, reconstruction module 210 selects a first and second bandwidth. As described above, in one embodiment, reconstruction module 210 selects a first bandwidth, used to configure a first complex filter, and a second bandwidth, used to configure a second complex filter.

Next, as indicated at block 915, reconstruction module 210 selects a first and second center frequency. As described above, in one embodiment, reconstruction module 210 selects a first center frequency, used to configure the first complex filter, and a second center frequency, used to configure the second complex filter. Next, as indicated at block 920, reconstruction module 210 generates a first and second filtered signal. As described above, in one embodiment, the first filter generates the first filtered signal and the second filter generates the second filtered signal.

Next, as indicated at block 925, estimator module 220 generates a first and second estimated frequency. As described above, in one embodiment, estimator module 220 generates a first estimated frequency based on the first filtered signal, and generates a second estimated frequency based on the second filtered signal.

Next, as indicated at block 930, estimator module 220 generates a first and second estimated bandwidth. As described above, in one embodiment, estimator module 220 generates a first estimated bandwidth based on the first filtered signal, and generates a second estimated bandwidth based on the second filtered signal.

Next, as indicated at block 935, analysis and correction module 230 generates a third estimated bandwidth based on the first and second estimated frequencies, the first and second center frequencies, and the first selected bandwidth. Next, as indicated at block 940, analysis and correction module 230 generates a third estimated frequency based on the third estimated bandwidth, the first estimated frequency, the first center frequency, and the first selected bandwidth.

Other modifications and implementations will occur to those skilled in the art without departing from the spirit and scope of the invention as claimed. Accordingly, the above description is not intended to limit the invention except as indicated in the following claims.

What is claimed is:

1. A method for extracting speech content from a digital speech signal, the speech content being characterized by at least one formant, each of the at least one formants characterized by an instantaneous frequency and an instantaneous bandwidth, the speech signal including a sequence of one or more of the at least one formants, the method comprising:

extracting each one of the sequence of one or more of the at least one formants from the digital speech signal, said extracting further comprising:

filtering the digital speech signal with a plurality of complex filters, the plurality of complex filters implemented in parallel as an overlapping processing chain, each of the complex filters having a bandwidth that overlaps with at least one other of the plurality of complex filters adjacent to it in the chain, each of the complex filters generating one of a plurality of complex filtered signals each including a real component and an imaginary component;

generating an estimated instantaneous frequency and an estimated instantaneous bandwidth from each of the plurality of filtered signals using a product set formed of each of the plurality of filtered signals in combination with a single lag delay of each of the plurality of the filtered signals; and identifying each of the sequence of one or more formants of the digital speech signal as one of the at least one formants based on the estimated instantaneous frequencies and estimated instantaneous bandwidths; and reconstructing the speech content of the digital speech signal based on the identified sequence of formants using a speech processing system.

2. The method of claim 1, wherein the overlapping bandwidths of the chain formed by the plurality of complex filters extend substantially over the bandwidth of the digital speech signal.

3. The method of claim 1, wherein at least one of the plurality of complex filters forming the chain is a finite impulse response (FIR) filter.

4. The method of claim 1, wherein at least one of the plurality of complex filters forming the chain is an infinite impulse response (IIR) filter.

5. The method of claim 1, wherein at least one of the plurality of complex filters forming the chain is a gammatone filter.

6. The method of claim 1, wherein each of the complex filters forming the chain includes a predetermined bandwidth and a predetermined center frequency, the predetermined center frequency of each of the complex filters being separated from the predetermined center frequencies of those complex filters adjacent thereto by a predetermined center frequency spacing.

7. The method of claim 6, wherein the predetermined center frequency spacing is approximately 2%.

8. The method of claim 6, wherein:

the predetermined bandwidth of each of the complex filters forming the chain is approximately 0.75 of its predetermined center frequency.

9. The method of claim 1 wherein said generating further comprises integrating the product sets formed for each of the plurality of filtered signals over a predetermined period of time to generate the estimated instantaneous frequency and the instantaneous bandwidth for each of filtered signals.

10. The method of claim 9 wherein the estimated instantaneous frequency and the-estimated instantaneous bandwidth from each of the plurality of filtered signals is generated using a product set formed from each of the plurality of filtered signals in combination with a two-or-more-lag delay of each of the plurality of signals.

11. The method of claim 6 wherein said generating further comprises correcting the estimated instantaneous bandwidth for each of the filtered signals using a difference between the estimated instantaneous frequency for two adjacent complex filters in the chain over the predetermined center frequency spacing.

12. The method of claim 11 wherein said generating further comprises improving accuracy of the estimated instantaneous frequency for each of the filtered signals by applying the corrected bandwidth for each of the filtered signals in a best-fit equation.

13. A method for extracting speech content from a digital speech signal, the speech content being characterized by at least one formant, each of the at least one formants characterized by an instantaneous frequency and an instantaneous bandwidth, the speech signal including a sequence of one or more of the at least one formants, the method comprising:

extracting each one of the sequence of formants from the digital speech signal, said extracting further comprising:

filtering the speech resonance signal with a plurality of complex filters so as to generate a plurality of complex filtered signals having a real component and an imaginary component;

forming an integrated-product set for each of the plurality of complex signals, the forming being performed by an integration kernel, the integrated-product set having at least one zero-lag complex product and at least one single-lag complex product;

generating an estimated instantaneous frequency and an estimated instantaneous bandwidth from each of the integrated-product sets; and identifying each of the sequence of one or more formants of the digital speech signal as one of the at least one formants based on the estimated instantaneous frequencies and estimated instantaneous bandwidths; and reconstructing the speech content of the digital speech signal based on the identified sequence of formants using a speech processing system.

14. The method of claim 13, wherein:

the plurality of complex filters are implemented in parallel as an overlapping processing chain; and at least one of the plurality of complex filters forming the chain is a finite impulse response (FIR) filter.

15. The method of claim 13, wherein:

the plurality of complex filters are implemented in parallel as an overlapping processing chain; and at least one of the plurality of complex filters forming the chain is an infinite impulse response (IIR) filter.

16. The method of claim 13, wherein:

the plurality of complex filters are implemented in parallel as an overlapping processing chain; and at least one of the plurality of complex filters forming the chain is a gammatone filter.

17. The method of claim 13, wherein:

the plurality of complex filters are implemented in parallel as an overlapping processing chain; and the overlapping bandwidths of the chain formed by the plurality of complex filters extend substantially over the bandwidth of the digital speech signal.

18. The method of claim 13, wherein:

the plurality of complex filters are implemented in parallel as an overlapping processing chain; and each of the complex filters forming the chain includes a predetermined bandwidth and a predetermined center frequency, the predetermined center frequency of each of the complex filters being separated from the predetermined center frequencies of those complex filters adjacent thereto by a predetermined center frequency spacing.

19. The method of claim 18, wherein the predetermined center frequency spacing between adjacent of the complex filters forming the chain is approximately 2%.

20. The method of claim 18, wherein:

the predetermined bandwidth of each of the complex filters forming the chain is 0.75 of its predetermined center frequency.

21. The method of claim 18, wherein:

the predetermined bandwidth of each of the complex filters forming the chain is 0.75 of its predetermined center frequency.

22. The method of claim 13, wherein:

the integration kernel is a second order gamma IIR filter.

23. A method for extracting speech content from a digital speech signal, the speech content being characterized by at least one formant, each of the at least one formants characterized by an instantaneous frequency and an instantaneous bandwidth, the speech signal including a sequence of one or more of the at least one formants, the method comprising:

extracting each one of the sequence of formants from the digital speech signal, said extracting further comprising:

filtering the speech resonance signal with a plurality of complex filters so as to generate a plurality of complex filtered signals having a real component and an imaginary component;

forming an integrated-product set for each of the plurality of complex signals, the forming being performed by an integration kernel, the integrated-product set having at least one zero-lag complex product and at least one-two-or-more-lag complex product;

generating an estimated instantaneous frequency and an estimated instantaneous bandwidth from each of the integrated-product sets; and identifying each of the sequence of one or more formants of the digital speech signal as one of the at least one formants based on the estimated instantaneous frequencies and estimated instantaneous bandwidths; and reconstructing the speech content of the digital speech signal based on the identified sequence of formants using a speech processing system.

24. The method of claim 23, wherein:

the plurality of complex filters are implemented in parallel as an overlapping processing chain; and at least one of the plurality of complex filters forming the chain is a finite impulse response (FIR) filter.

25. The method of claim 23, wherein:

the plurality of complex filters are implemented in parallel as an overlapping processing chain; and at least one of the plurality of complex filters forming the chain is an infinite impulse response (IIR) filter.

26. The method of claim 23, wherein:

the plurality of complex filters are implemented in parallel as an overlapping processing chain; and at least one of the plurality of complex filters forming the chain is an gammatone filters.

27. The method of claim 23, wherein:

the plurality of complex filters are implemented in parallel as a processing chain; and the overlapping bandwidths of the chain formed by the plurality of complex filters extend substantially over the bandwidth of the digital speech signal.

28. The method of claim 23, wherein:

the integration kernel is a second order gamma IIR filter.

29. The method of claim 23, wherein:

the plurality of complex filters are implemented in parallel as an overlapping processing chain; and each of the complex filters forming the chain includes a predetermined bandwidth and a predetermined center frequency, the predetermined center frequency of each of the complex filters being separated from the predetermined center frequencies of those complex filters adjacent thereto by a predetermined center frequency spacing.

30. The method of claim 29, wherein the predetermined center frequency spacing between adjacent of the complex filters forming the chain is approximately 2%.

31. The method of claim 29 wherein said generating further comprises correcting the estimated instantaneous bandwidth for each of the filtered signals using a difference between the estimated instantaneous frequency for two adjacent complex filters in the chain over the predetermined center frequency spacing.

32. The method of claim 31 wherein said generating further comprises improving accuracy of the estimated instantaneous frequency for each of the filtered signals by applying the corrected bandwidth for each of the filtered signals in a best-fit equation.

33. An apparatus for recognizing speech content within a digitized speech signal, the speech content being characterized by at least one formant, each of the at least one formants characterized by an instantaneous frequency and an instantaneous bandwidth, the speech signal including a sequence of one or more of the at least one formants, the apparatus comprising:

a reconstruction module configured to receive the digital speech signal, the reconstruction module comprising a plurality of complex filters, the plurality of complex filters implemented in parallel as a overlapping processing chain, each of the complex filters having a bandwidth that overlaps with at least one other of the plurality of complex filters adjacent to it in the chain, each of the complex filters generating one of a a plurality of filtered signals including a real component and an imaginary component an estimator module coupled to receive the plurality of filtered signals from the reconstruction module, the reconstruction module configured to generate an estimated instantaneous frequency and an estimated instantaneous bandwidth from each of the plurality of filtered signals using a product set formed of each of the plurality of filtered signals in combination with a single lag delay of each of the plurality of filtered signals; and a post-processing module of speech processing system configured to receive the estimated instantaneous frequency and instantaneous bandwidth estimates for each of the plurality of filtered signals, the post-processing module for identifying each of the sequence of one or more formants of the digital speech signal as one of the at least one formants based on the estimated instantaneous frequencies and estimated instantaneous bandwidths of the plurality of filtered signals, and for reconstructing the speech content of the digital speech signal using the identified formants.

34. The apparatus of claim 33, wherein the estimator module further comprises an integration kernel configured to integrate the product sets formed for each of the plurality of filtered signals over a predetermined period of time to generate the estimated instantaneous frequency and the instantaneous bandwidth for each of filtered signals.

35. The apparatus of claim 34, wherein the integration kernel is a second order gamma IIR filter.

36. The apparatus of claim 34, wherein the estimated instantaneous frequency and the estimated instantaneous bandwidth from each of the plurality of filtered signals is generated using a product set formed from each of the plurality of filtered signals in combination with a two-or-more-lag delay of each of the plurality of signals.

37. The apparatus of claim 33, wherein at least one of the complex filters of the reconstruction module is a gammatone filter.

38. The apparatus of claim 33, wherein each of the complex filters forming the chain includes a predetermined bandwidth and a predetermined center frequency, the predetermined center frequency of each of the complex filters being separated from the predetermined center frequencies of those complex filters adjacent thereto by a predetermined center frequency spacing.

39. The apparatus of claim 38, wherein the predetermined center frequency spacing is approximately 2%.

40. The apparatus of claim 39, wherein:

the predetermined bandwidth of each of the complex filters forming the chain is approximately 0.75 of its predetermined center frequency.

41. The apparatus of claim 38 further comprising a correction module coupled to receive the the estimated instantaneous frequency and the estimated instantaneous bandwidth from the estimator module, the correction module providing a corrected estimated instantaneous bandwidth for each of the filtered signals to the post-processing module using a difference between the estimated instantaneous frequency for two adjacent complex filters in the chain over the predetermined center frequency spacing.

42. The apparatus of claim 41 wherein the correction module further provides a corrected estimated instantaneous frequency for each of the filtered signals to the post-processing module by applying the corrected bandwidth for each of the filtered signals in a best-fit equation.

* * * * *